Figure 4:
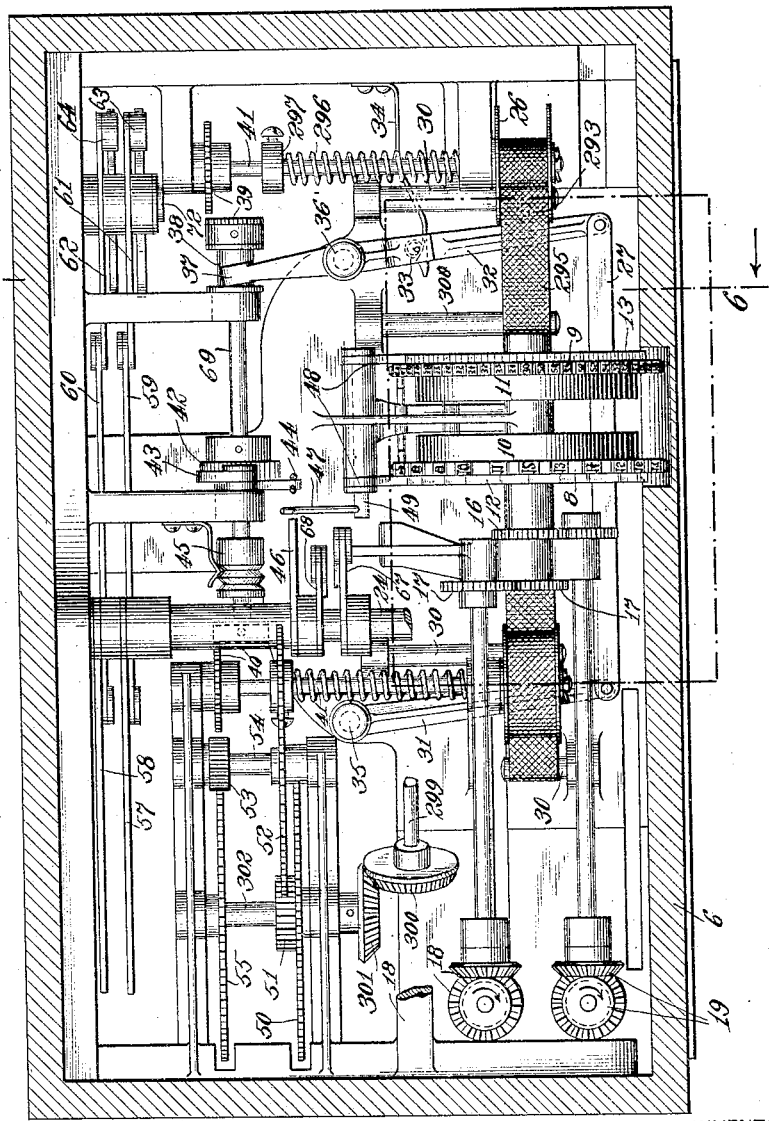

H. T. GOSS & J. W. BRYCE.
RECORDER.
APPLICATION FILED AUG. 30, 1905.
1,049,473.
Patented Jan. 7, 1913.
10 SHEETS—SHEET 1.
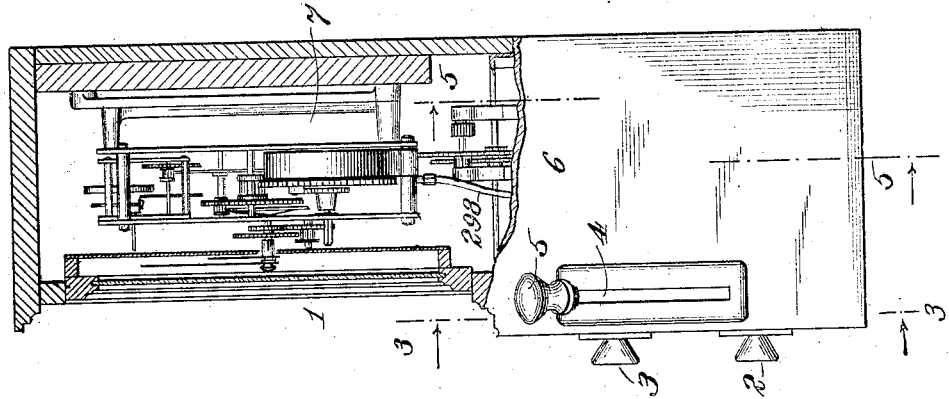
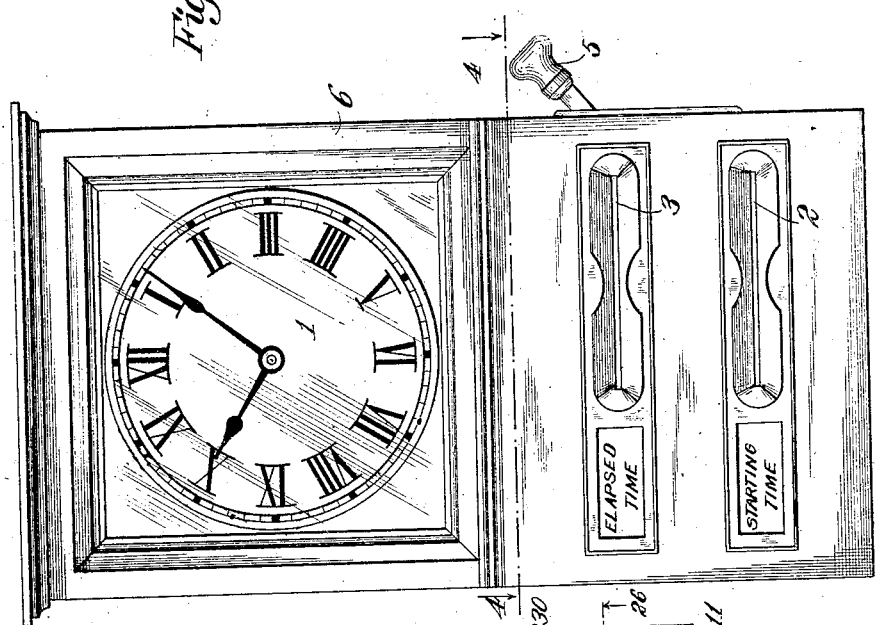
WITNESSES:
John O. Templer
T. E. Raftery
INVENTORS
Harry T. Goss
James W. Bryce
BY
Kenyon & Kenyon
ATTORNEYS

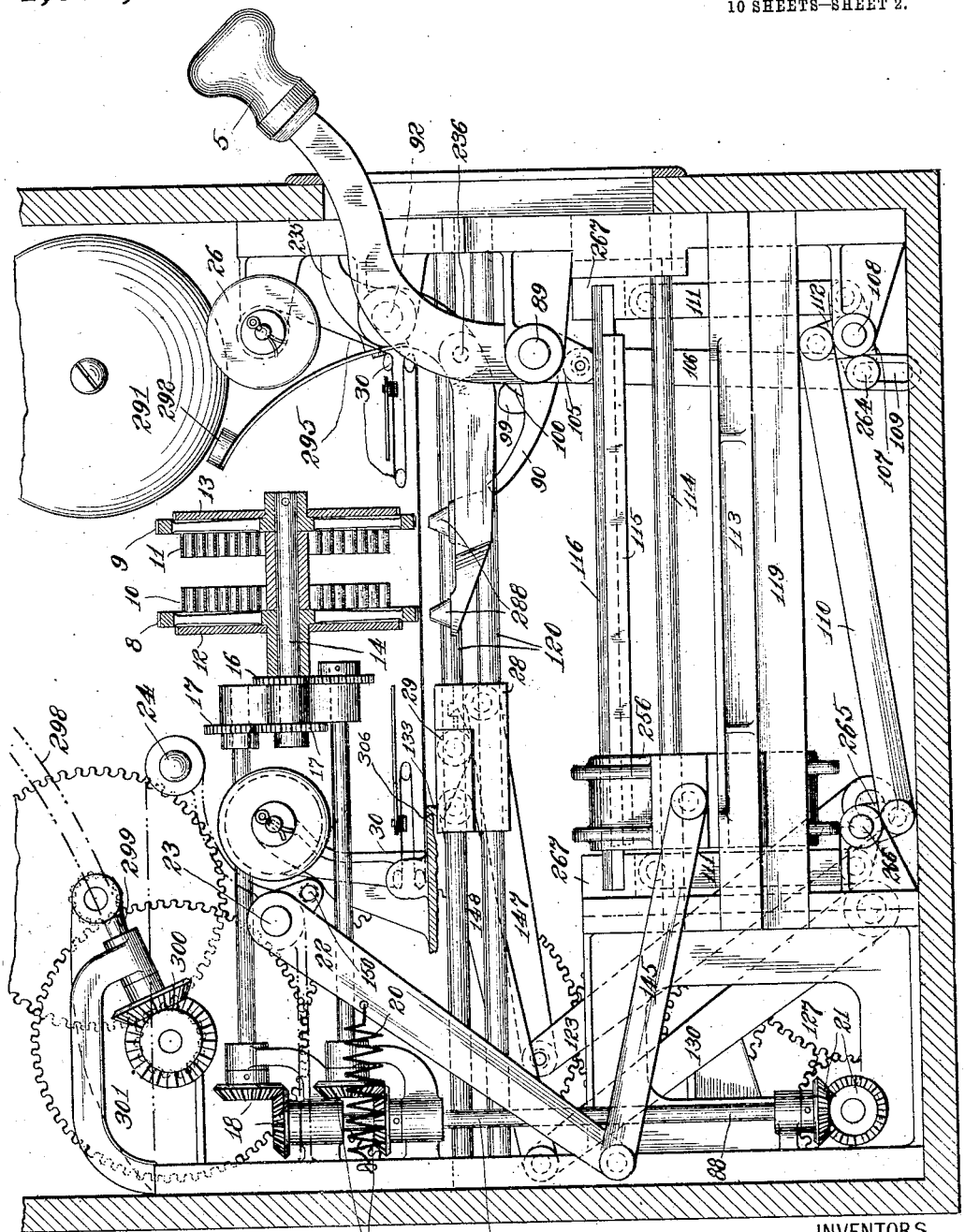

H. T. GOSS & J. W. BRYCE.
RECORDER.
APPLICATION FILED AUG. 30, 1905.

1,049,473.

Patented Jan. 7, 1913.
10 SHEETS—SHEET 3.

WITNESSES:
John O. Gempler
T. E. Raftery

INVENTORS
Harry T. Goss
James W. Bryce
BY
Kenyon & Kenyon
ATTORNEYS

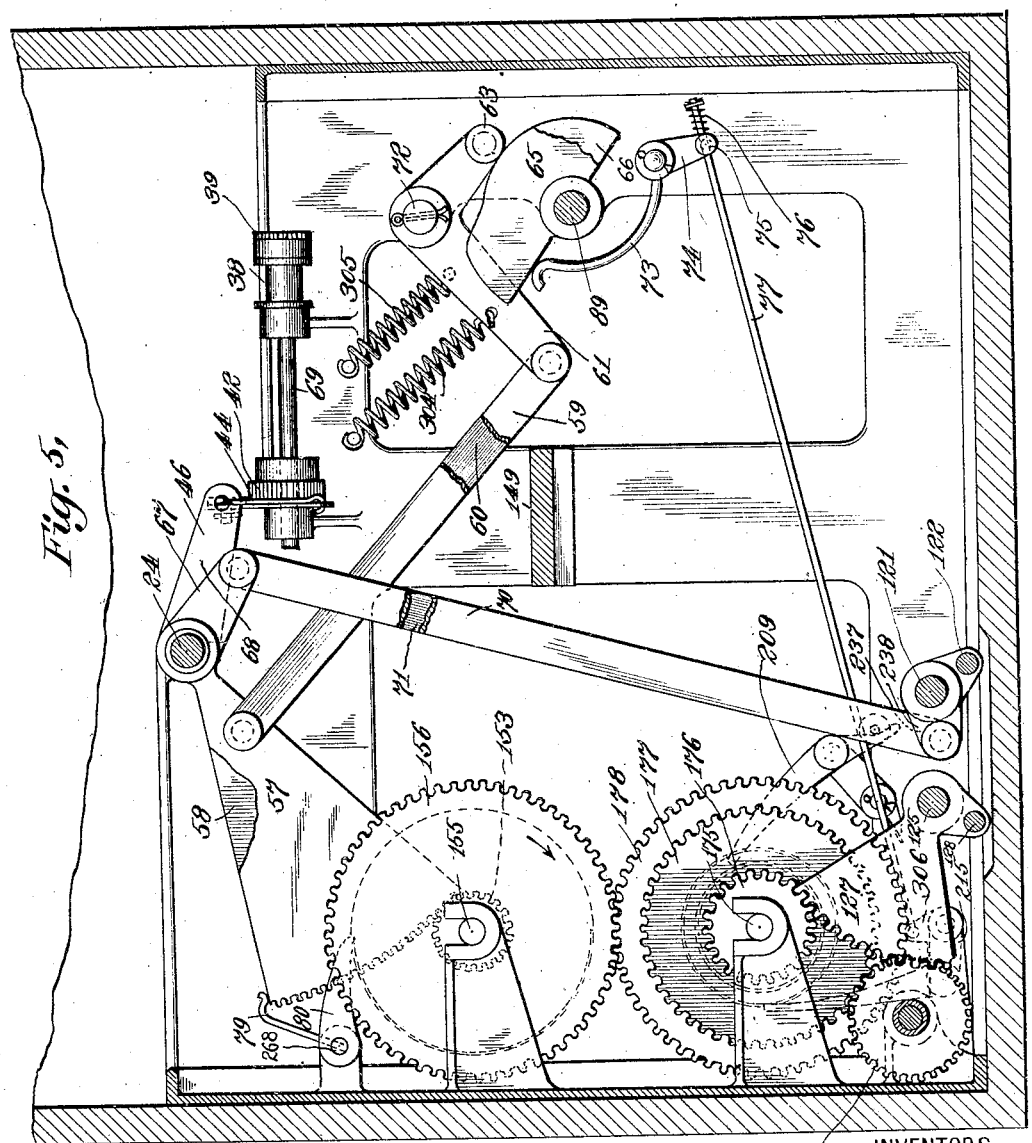

H. T. GOSS & J. W. BRYCE.
RECORDER.
APPLICATION FILED AUG. 30, 1905.
1,049,473.
Patented Jan. 7, 1913.
10 SHEETS—SHEET 5.
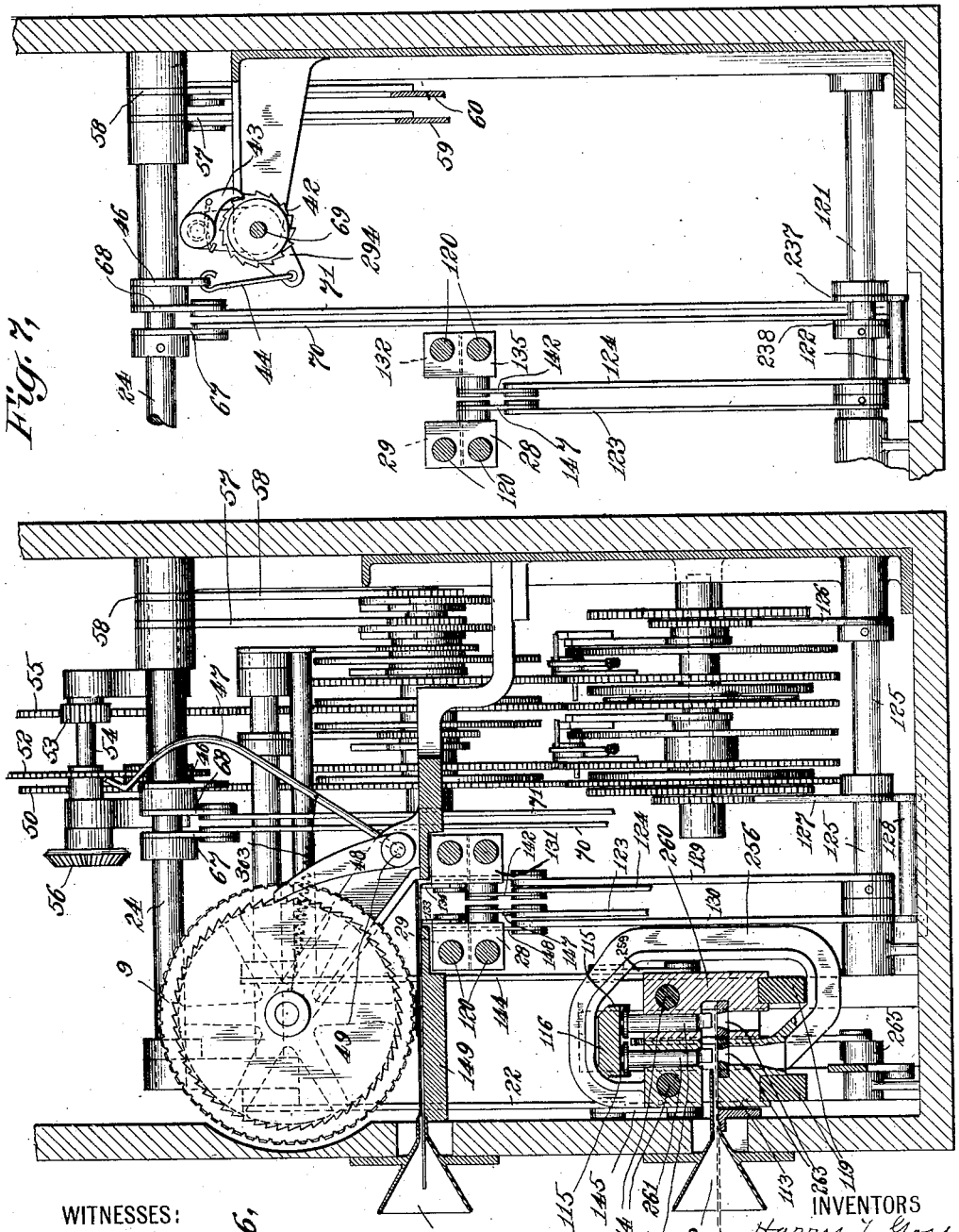

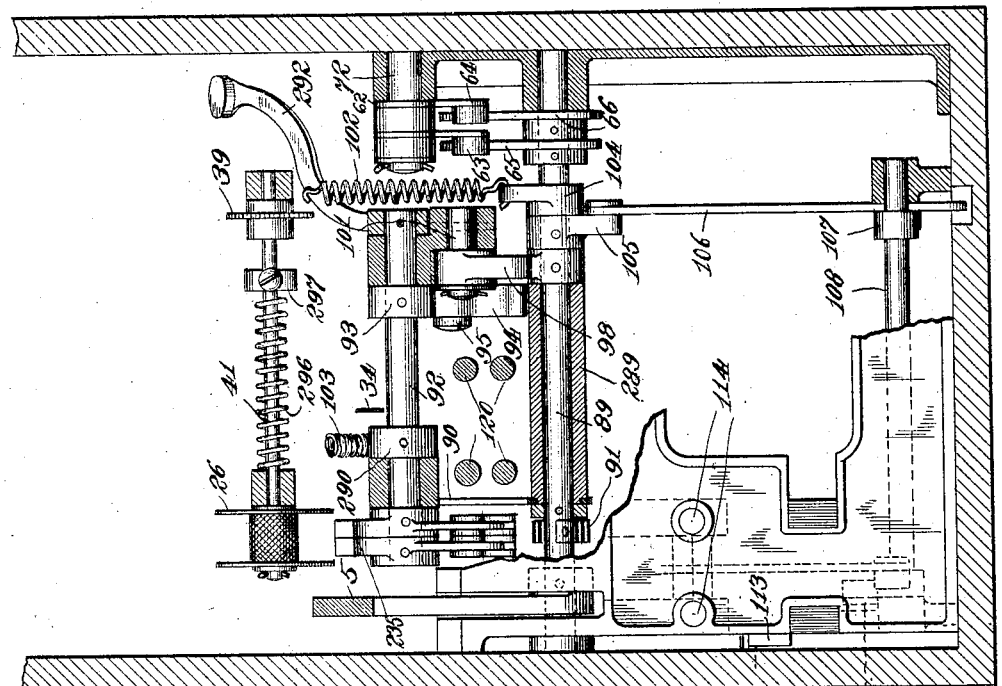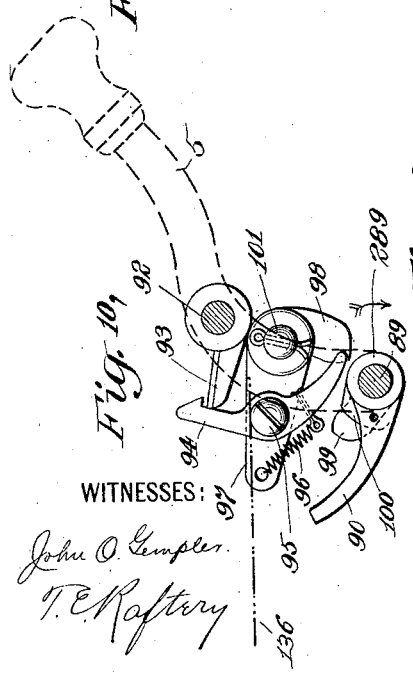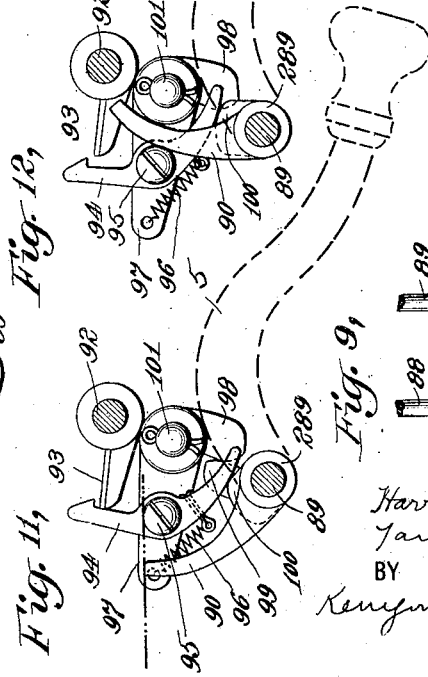

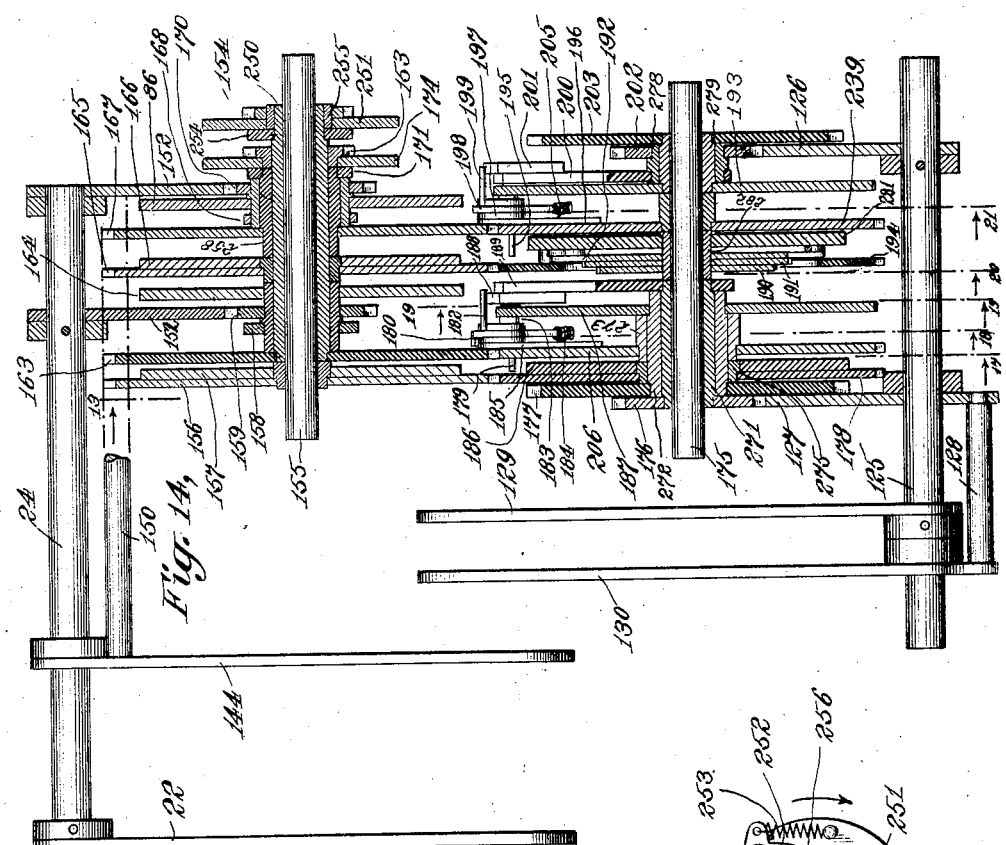

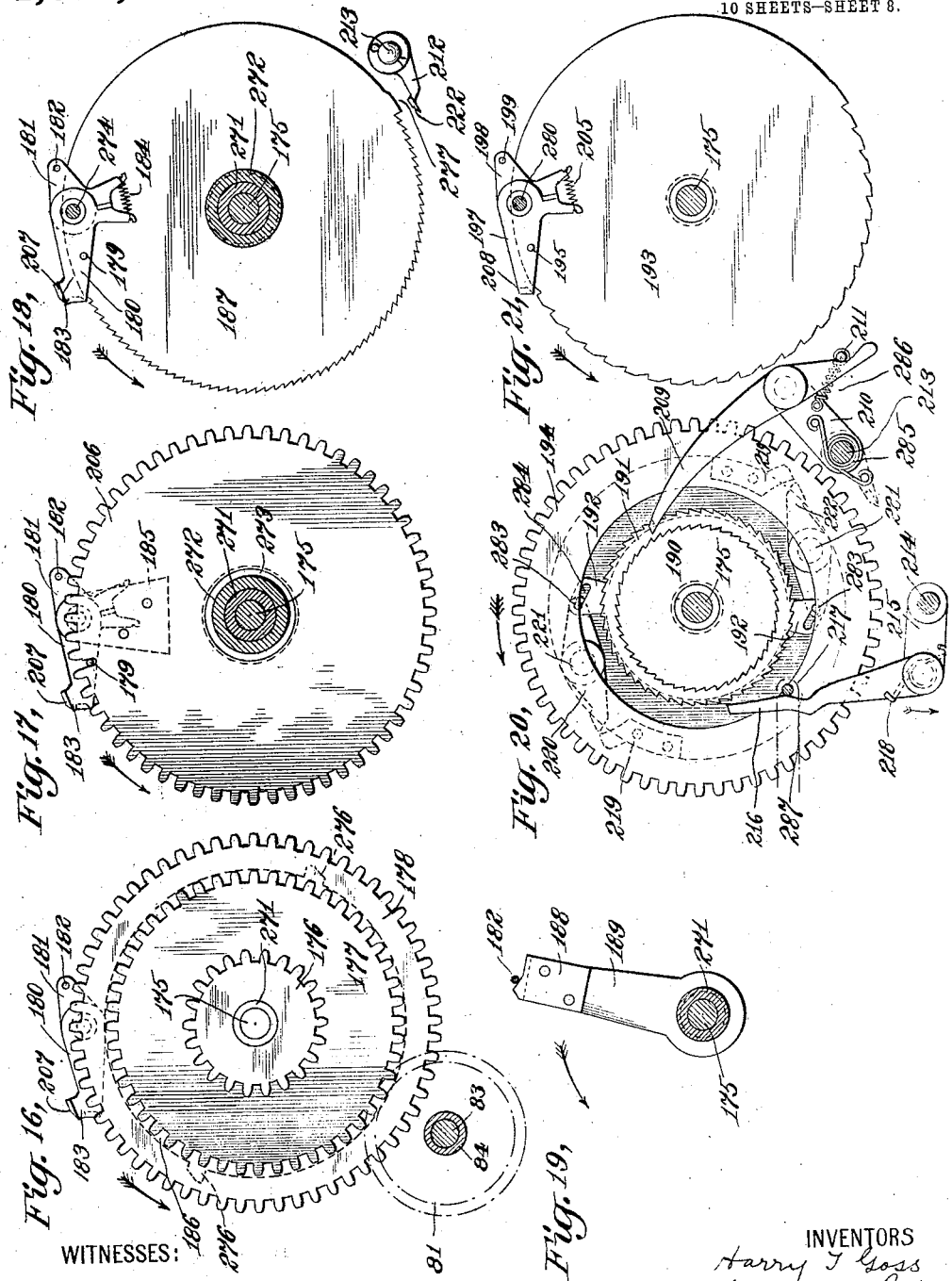

H. T. GOSS & J. W. BRYCE.
RECORDER.
APPLICATION FILED AUG. 30, 1905.
1,049,473.
Patented Jan. 7, 1913.
10 SHEETS—SHEET 9.
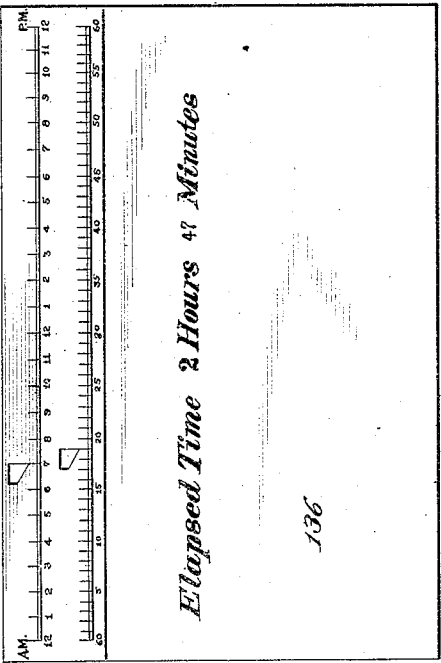
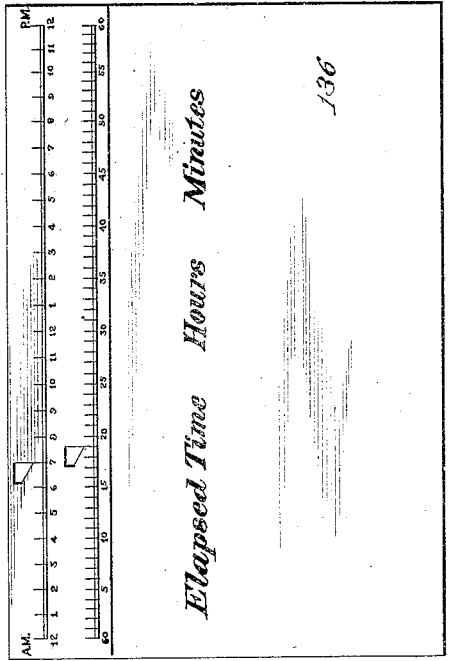
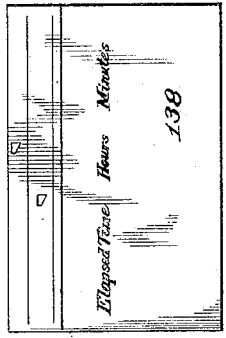
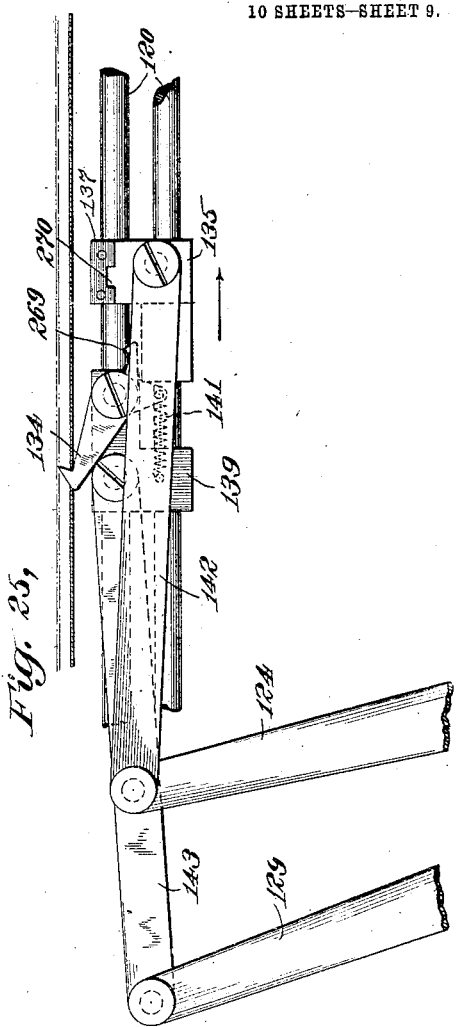
WITNESSES:
INVENTORS
Harry T. Goss
James W. Bryce
BY
Kenyon & Kenyon
ATTORNEYS H. T. GOSS & J. W. BRYCE.
RECORDER.
APPLICATION FILED AUG. 30, 1905.
1,049,473.
Patented Jan. 7, 1913.
10 SHEETS—SHEET 10.
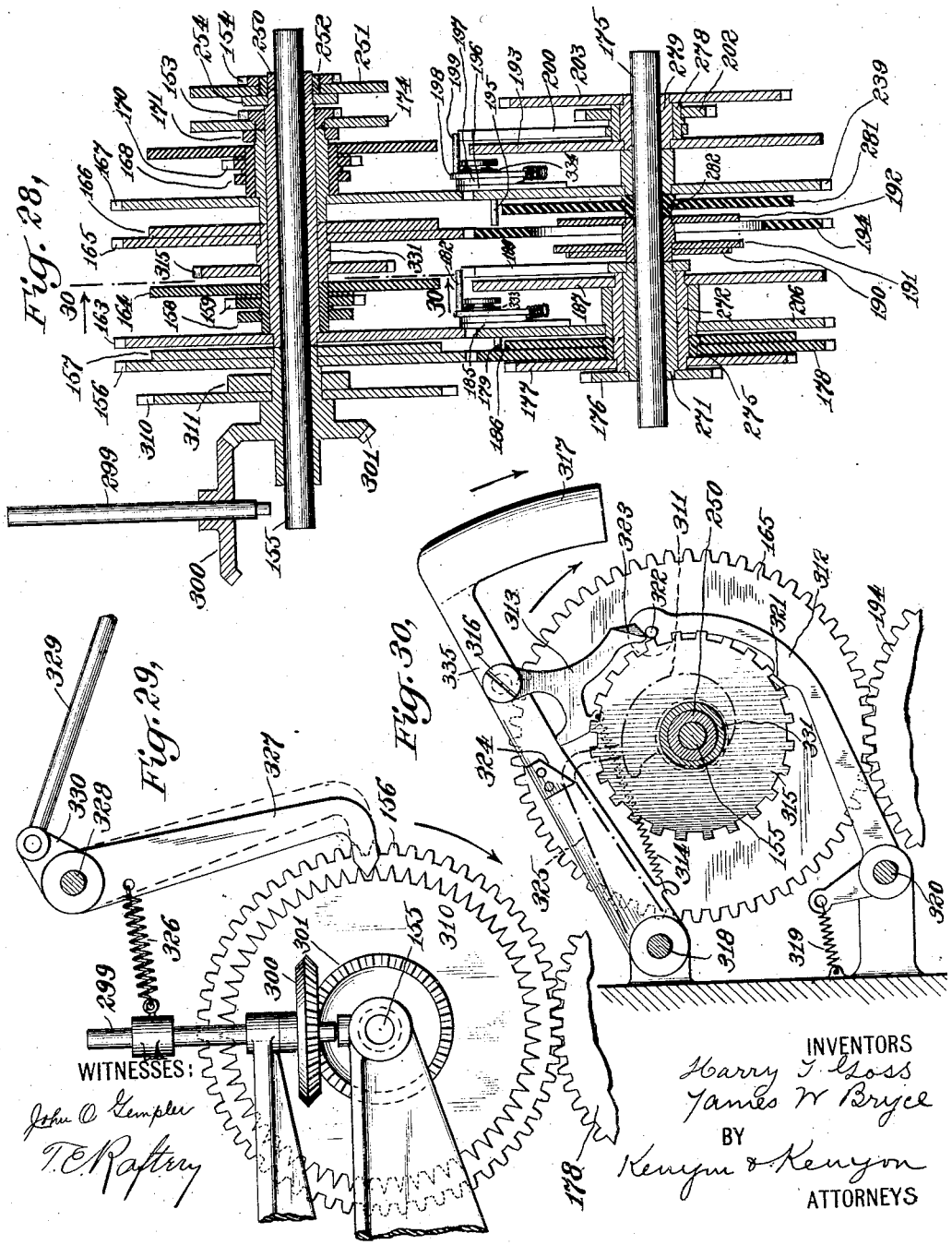

UNITED STATES PATENT OFFICE.

HARRY T. GOSS AND JAMES W. BRYCE, OF RUTHERFORD, NEW JERSEY, ASSIGNORS, BY MESNE ASSIGNMENTS, TO INTERNATIONAL TIME RECORDING COMPANY OF NEW YORK, A CORPORATION OF NEW YORK.

RECORDER.

1,049,473.     Specification of Letters Patent.     Patented Jan. 7, 1913.

Application filed August 30, 1905. Serial No. 276,361.

*To all whom it may concern:*

Be it known that we, HARRY T. Goss and JAMES W. BRYCE, citizens of the United States, and residents of Rutherford, county of Bergen, and State of New Jersey, have invented new and useful Improvements in Recorders, of which the following is a specification.

Our invention relates to recorders. It is of special value in connection with time recorders and particularly in connection with indicating elapsed times, as for example the elapsed time between the starting of work on a particular job and the stopping of work thereon. It is however not limited to such uses; nor is it limited to indicating differences in time, as it may be used for indicating other differences, as for example, in money values.

Our invention is illustrated in the drawings, accompanying this specification and forming a part thereof, in connection with a machine for indicating elapsed times between the starting and finishing of work, by an operator, on a job or of a day's work of the operator, although of course it is not limited to use in such a machine. The form of indication made in the particular machine shown in the drawings is printing the elapsed time in hours and minutes upon a card inserted by the operator in a suitable receptacle in the machine. Any other suitable method or form of indication may however be employed if desired, as for example, visual signal or display.

We will now proceed to describe the particular embodiment of our invention contained in the machine shown in the drawings. In this embodiment there are devices controlled by a clock movement for placing on a card, inserted by the operator in a suitable receptacle, as shown, starting time marks, one for the hours and one for the minutes; elapsed time indicating mechanism for indicating, by printing upon the card, the elapsed time; means for operating such mechanism, preferably independent of the clock movement; devices, as shown one for the hours and one for the minutes, coöperating with and controlled by the starting time marks on the card, when inserted later on in a suitable receptacle for the purpose, to start the elapsed time indicating mechanism; and stops, controlled by the clock movement, one for hours and one for minutes, for stopping the elapsed time indicating mechanism; and suitable means for effecting the printing. The result is the printing upon the card of the time that has elapsed between the insertion by the operator of the card in the starting time receptacle and its insertion later on in the elapsed time receptacle. Referring in somewhat greater detail, the clock movement by means of suitable gearing, positions certain cams, and these act as stops to stop the rotation of the elapsed time type wheels.

Slots, preferably two in number, are provided in the face of the device, labeled "Starting time" and "Elapsed time," respectively. When it is desired to obtain a record of elapsed time, a card of the correct size is inserted by the operator in the slot marked "Starting time," and the handle is pulled down and a record is thereby obtained of the time of such operation. In the form of device about to be described, this record takes the form of two holes punched near the edge of the card and opposite a pair of scales previously printed at the correct distances from the edge of the card. One of these scales is divided into twenty-four parts, each part representing an hour of the day. Below this is the second scale divided into sixty parts, each part representing one minute. It is obvious, however, that by changing the scales on the cards and changing the number of teeth on certain gears in the mechanism, that the instrument could print any other intervals of time or its money value at a predetermined rate or could print other values. Values may also be printed in other moneys besides United States currency by suitable alteration of the gearing connected to the type wheels.

When the card is inserted in the slot marked "Starting time," the handle is drawn down by the operator causing two punches to be pushed along the edge of the card and to be brought to a stop at the correct points by the cams or stops controlled by the clock. The punches are then forced through the card and are then returned to their normal or zero position. By this arrangement we obtain a device which has no "drop off" (*i. e.* no return to zero at some predetermined hour during the day), as would be the case were the punches fed forward and returned directly by the clock itself. We also keep the load of driving the mechanism off of the clock and put it on the handle from which ample power is more readily obtained. The handle in the machine shown thus constitutes the means for operating the elapsed time indicating mechanism.

As the apparatus shown is designed, there is nothing to be driven by the clock but a pair of cams which are preferably built in the form of disks and are therefore balanced.

When it is desired to obtain a record of elapsed time *i. e.* the time that has expired since the punching of the card, the said card is inserted by the operator in the slot marked "Elapsed time" and the same handle is pulled down as before. In this case a pair of selecting fingers traverse the card from left to right and spring into the holes previously punched. This immediately causes the type wheels to start turning about their axes. The holes previously punched in the card, thus constitute starting time identifying marks placed on the card and the selecting fingers constitute devices adapted to coöperate with the said marks on the card, which thus control them for the purpose of starting the elapsed time indicating mechanism into operation. The type wheels continue to turn until stopped by the beforementioned cams operated by the clock. This of course, occurs before the type wheels have quite completed a revolution. An instant later the hammers are tripped off by the handle and an impression of the characters on the type wheels standing opposite the card is made on its face, in a blank space provided for the purpose. If, however, the card is not inserted deep enough into the slot, or no card at all is inserted, the hammers do not act as the trip off is put out of engagement by a finger provided for this purpose. This finger travels upward with the movement of the handle and if arrested in its travel by the presence of a card, does not interfere with the trip which is normally in a position to act on the hammers. If, however, it is allowed to complete its travel, as when no card is inserted or a card is not inserted far enough, it forces the trip pawl out of engagement and the hammers remain in their normal or operative position and no printing is done.

It will be seen that we are thus enabled to print any number of overlapping "elapsed times" and any number of "starting times" may be taken before any "elapsed time" records are printed and any number of "elapsed time" records may be taken in succession. Furthermore, it makes no difference at what time of day or night any record starts as the clock records any time up to twenty-four hours, and can be made accurate to a minute. If desired minutes and seconds or hours, minutes and seconds could be printed with suitable modifications.

If any one attempts to make a false record by failing to insert the card far enough into the "starting time" slot, it will be indicated by the holes not being in register with the scale printed on the card, when a scale is employed, or by the total absence of one or both of the holes. The card cannot be moved endwise in the slot owing to the slot being provided with metal guides.

Referring now to the drawings. Figure 1 is a front elevation, and Fig. 2 is a side elevation of the device, Fig. 2 being broken away to show the connection of the clock gearing to the set of clock cams. Fig. 3 is a vertical section on the line 3—3 of Fig. 2. Fig. 4 is a horizontal section on the line 4—4 of Fig. 1. This figure illustrates the ribbon mechanism, type gear and gearing to the clock. The cams for driving the punch and type gearing are shown in Fig. 5 which is the vertical section on the line 5—5 of Fig. 2. Fig. 6 is a vertical cross section on the line 6—6 of Fig. 4. Fig. 7 is a detail view illustrating the means for feeding the ink ribbon and levers for moving the "selecting fingers" across the card. The hammer trip mechanism is illustrated in Fig. 8 which is an end view with the side frame of the machine broken away. Details of the hammer trip mechanism and throw-out finger therefor are illustrated in Figs. 10, 11 and 12. Fig. 9 illustrates the means of connecting the type wheel gears shown in the end view in Fig. 5. Fig. 14 is a vertical section showing the punch gear mechanism and type gear mechanism. In Fig. 13 is shown an end view of the punch gear mechanism. The uni-direction driving gear is shown in Fig. 15. Figs. 16, 17, 18, 19, 20 and 21 are the end view and detail section of the type gear mechanism shown in cross section in Fig. 14. Figs. 22 and 23 are detail views of the card before and after taking a record of elapsed time. Fig. 25 is a detail view showing the action of the selecting fingers. In Figs. 26 and 27 are shown the throw-out device arranged to cut out the noon and midnight hours, so that in taking a record of elapsed time these hours will not be recorded on the card. Fig. 24 illustrates the form of card used when this device is in gear between the clock and the recording mechanism. Figs. 28, 29 and 30 represent a modification in the mechanism for driving the clock cams, Fig. 28 being a central vertical section similar to Fig. 14, Fig. 29 an end view, and Fig. 30 a section on the line 30—30 of Fig. 28.

Referring to the specific form of our improvement shown in the drawings we will now proceed to describe the devices there shown and their mode of operation taking them up in the order, as nearly as possible, in which the various steps are performed in the operation of the machine.

*The devices for bringing the punches into position.*—These devices are particularly illustrated in Figs. 1, 5, 6, 8, 13, 14, and 22. The operator first inserts his card, a form of which is shown in Fig. 22, in the starting time slot and then pulls down the handle 5. This moves over the card from left to right two punches, a minute punch and an hour punch. These punches move until they are stopped by cams driven by the clock work 7 of the machine. This causes the hour and minute punches to be brought into correct position over the card and with the edge of each punch in line with the marks on the scale representing the hour and minute when the machine is operated. The continued operation of the handle causes these punches to be forced downward through the paper making holes in the card which holes represent the time when the operation takes place, the edge of each hole indicating the hour or minute of the operation as clearly shown in Fig. 22. These holes constitute starting time identification marks as will presently be shown. Their location on the card is controlled by the clock movement.

Preferably the minute punch is moved its full movement and then after that the hour punch is moved. These movements are caused preferably by the movement of handle 5, fast on shaft 89. The devices shown for moving the minute punch are as follows: Fast on this shaft is a minute cam 66 (Fig. 5). Riding on this is a roller 64 of bellcrank lever 62 pivoted on a stud in the framework at 72 and carrying at its other end a link 60 secured to the driving sector 58. The latter meshes with a pinion 154 loose on shaft 155. This pinion 154 is fast to disk 251 (Figs. 14 and 15) being secured to a common hub 255 loose on sleeve 250. Disk 251 carries a pawl 252 (Fig. 15) provided with a spring 253, the pawl engaging with a single tooth 256 on disk 254. This disk is fast on sleeve 250. Fast on the other end of this sleeve is a driving gear 163. Mounted on this gear is driving pawl 160 (Fig. 13) adapted to engage with an arm 158 of pinion 159 loose on sleeve 250. Driving sector 58 turns pinion 154 a full revolution in the downward movement of the driving sector. This through disk 251 and pawl 252 gives a complete revolution to disk 254 and thence to gear 163. The return movement of driving sector 58 of course does not affect gear 163, the latter always rotating in the same direction and turning a complete revolution on each operation of the handle.

Pinion 159 moves the minute punch frame 256 (see Fig. 6). Pinion 159 is connected with minute punch frame 256 by link 145, arm 22, shaft 24 (Fig. 14) and sector 152. Pinion 159 can be rotated only one-half a revolution or through one hundred and eighty degrees as a maximum and will be rotated a less distance depending upon the position of the minute disk clock cams 257 (Fig. 13) mounted on the disk 157 driven by the clock work. Disk 157 is provided with two of these cams arranged one hundred and eighty degrees apart. One of these cams is therefore always located within a half circle and driving pawl 160 rides up upon this cam and is freed from arm 158 on pinion 159. Arm 158 and pinion 159 remain in any position to which they are moved. They are moved against a spring 20 shown in Fig. 3. They are held in their set position against this spring by means of a ratchet wheel 164 and pawl 80 (Fig. 5) mounted on the side frame of the machine. In this way the position of the minute disk cam 157 determines the position to which the minute punch is moved over the card from left to right so that the set position of the punch will indicate the exact minute when the handle is pulled down. Disk 157 is driven by the clock work by means presently to be described.

Driving pawl 160 is frictionally held in whatever position it is moved into. At the completion of the revolution of gear 163 pawl 160 strikes a spring 161 on the side of the machine and is restored to operative position. Spring 161 not only restores pawl 160 to its operative position, but also permits the clock cams 257 to rise and pass under it, whenever in their rotation they reach it, whereupon spring 161 immediately returns the pawl to its operative position again.

The hour punch is moved into set position by means of the following devices; cam 65 fast on shaft 89 (Fig. 5), roller 63, bellcrank 61 pivoted on stud 72, link 59, driving sector 57 gearing with pinion 153 loosely mounted on sleeve 250 and fast to disk 174 (Fig. 14) which drives disk 171 by a spring pressed pawl (not shown) similar to 252. Disk 171 is fast on sleeve 258 carrying gear 167. This gear has mounted on it a pawl (not shown) exactly similar to pawl 160 on gear 163 and this gear completes a revolution on each operation of the handle exactly as does gear 163. This pawl operates an arm 168 on a pinion 170 and pinion 170 engages a sector 152. This sector has a crossover rod 150 fast on arm 144. Arm 168 and pinion 170 have mounted fast with them a ratchet wheel 86 similar to 164 having a pawl (not shown) in engagement with it mounted on the same stud as pawl 80 and operating in the same way. Arm 144 at its lower end has a link 259 connected to hour punch frame 260 (Fig. 6). The hour cam disk 166 is provided with and driven by clock work, as will be presently described, and is also provided with two cams (not shown) arranged exactly as are cams 257 on disk 157. The length of movement of the hour punch frame is determined by the position of the hour cam on disk 166 in exactly the same manner as already described for the minute mechanism. The minute punch frame carries a minute punch 261 and the hour punch frame carries a similar punch 262 which coöperate with dies 263.

The minute and hour punch frames are each supported by and move upon a rod 114 and a guide 119 fast to the framework of the machine.

After the punches have been brought into the proper position to indicate the time they are forced downward through the card so as to punch holes preferably of the form shown in Fig. 22. The means for operating the punches will now be described.

*Punch-operating devices.*—These are particularly illustrated in Figs. 3, 6 and 8. As shown they consist of the following devices. Fast on shaft 89 is a crank arm 105. Pivoted to this is a link 106 having a slot 109 at its lower end. Through this slot projects a pin 264 fast to crank arm 107 secured to rock shaft 108. This rock shaft carries bellcrank 112, one arm of which is pivoted to a link 111 and the other arm by means of a link 110 and bellcrank lever 265, pivoted at 266 to the framework, is secured to a second and similar link 111. Each of these is pivoted to a block 267 which blocks carry universal bar 116. The universal bar extends over the punches the entire distance of the travel of the punch frames. When the handle is pulled downward the mechanism above described pulls universal bar 116 downward and this forces both of the punches downward and through the paper. On the return or upward movement of bar 116 the punches are carried upward by means of metallic L-shaped pieces 115 running on each side of the universal bar 116 and arranged to catch under a projecting part of the punches as shown in Fig. 6. These L-shaped pieces lift the punches up with them as the universal bar rises pulling the punches out of the paper and into their normal position. These parts are returned to their normal position by spring 102 (Fig. 8) fastened to the side frame of the machine and a crank arm 104 fast on shaft 89. These return the handle and all its connecting parts to their normal position.

Pawls 80 are normally held out of engagement with the ratchet wheels 164 and 86 by means of a wire 79 fast in shaft 268 (Fig. 5) which carries the pawls 80. Driving sector 57 in the normal position of the parts forces wire 79 slightly upward lifting the pawls out of engagement with their ratchet wheels. The first movement of driving sector 57 permits the pawls to be thrown into operative position. The return of driving sector 57 to its original position again removes the pawls from locking position whereby the ratchet wheels and their connecting parts all return to their normal positions under the influence of springs 20, shown in Fig. 3. All of the parts that have been operated have now been returned to their normal or original positions and the machine is ready for the insertion of another card in either slot or the same card in the elapsed time slot.

When the operator has completed the job or the day is ended, he inserts the same card, that has been previously punched, in the elapsed time slot and again pulls down the handle. This causes selecting fingers to move over the card from left to right until they spring into the holes previously punched in the card. There is a selecting finger for the minute hole and one for the hour hole. The minute selecting finger moves first. When it drops into the minute hole in the card, a minute type wheel is released and is moved by devices presently to be described, until it is stopped by a minute cam controlled by the minute gear of the clock work and then the hour selecting finger moves until it drops into the hour hole when an hour type wheel is released and is moved by suitable mechanism until it is similarly stopped by an hour cam controlled by the hour gear of the clock mechanism. The selecting fingers in the machine shown thus constitute devices, coöperating with and controlled by the starting time identification marks on the card, for starting the elapsed time indicating mechanism. The continued operation of the handle then actuates the printing mechanism causing the number of the hour and minute to be printed upon the card in the spaces left for them, shown in Fig. 22, Fig. 23 illustrates an instance in which such printing has been done. The parts are then automatically returned to their original or normal positions and the card is withdrawn by the operator. These devices will now be described.

*The devices for moving the selecting fingers over the card.*—The devices for illustrating the movement of the selecting fingers are especially shown in Figs. 1, 3, 5, 6, 7 and 25. Where the number of the minute when the operator inserts a card in the elapsed time slot is higher than the number of the minute when he inserted the same card in the starting time slot, the elapsed time in hours will be correctly represented by the travel of the hour type wheel from the time it is released by the hour selecting finger falling into its hole in the card to the time it is stopped by the hour cam. But where the said former number is a smaller one than the latter, it is evident that one must be subtracted from the number of hours. This is accomplished, in the form of machine shown in the drawings, by providing an additional cam stop adapted, at the proper time to be thrown into operative position to stop the hour type wheel one point or hour sooner than it would be stopped by the regular hour cam. The devices for doing this will be presently described. For this reason the minute selecting finger and minute type wheel should move first and complete their operation before the hour selecting finger and the hour type wheel are moved in order that the said additional cam stop may, in the proper case, be moved into operative position.

The devices for moving the minute selecting finger are as follows: As sector 58 moves downward it rotates shaft 24 upon which it is fast and lifts crank arm 67 pulling upward link 70 attached to crank arm 238 fast on shaft 121. This rotates shaft 121 and causes driving arm 123 to swing upward and to the right causing it to move the minute selecting devices from left to right across the scale on the card. The details of this part of the movement are the same as those for moving the hour selecting finger and as those are shown more in detail these parts will be described later or in connection with the similar devices for moving the hour selecting finger. The hour selecting finger is moved through driving sector 57, a crank arm 68, link 71, crank arm 237, crossover 122, driving arm 124, see Figs. 7 and 25. This driving arm 124 has pivoted to its upper end a link 142 secured to a driving block 135. This driving block is mounted to move freely on guide rods 120 secured in the side frames of the machine. 134 is the hour selecting finger. It is carried on a driven block 139, similarly mounted on guide rods 120. It is removably secured to and driven by driving block 135 by means of a hook 269 integral with the selecting finger and adapted to engage into detent 270 in piece 137 secured to block 135. 141 is a spring for throwing the selecting finger upward and into the hole punched in the card. In Fig. 25 the driving block and driven block are shown as disconnected. The driving block is always carried to the extreme right in every operation of the handle. This is true whether a card is inserted in the slot or not. The driven block 139, however, remains underneath the hole in the card, as shown in Fig. 25. Exactly similar devices are used between the minute driving arm 123 and the minute selecting finger 133 (Figs. 3 and 6). Of these 147 is the link corresponding with 142. Driving block 28 corresponds to block 135 and driven block 29 corresponds with block 139.

By means of the above devices the two selecting fingers have been moved along the card until forced upward into the holes punched into the card. This starts the type wheels revolving. We will now proceed to describe such devices.

*Type-wheels and their operating devices.—* 9 is the minute type wheel and 8 the hour type wheel (Figs. 3 and 4). These type wheels are constructed in a similar manner and are driven by similar gearing. The minute type wheel is provided with a spring 11 to restore it to its zero or normal position. 13 is a ratchet wheel fast to the minute wheel 9 to hold it in set position, pawl 48 (Figs. 4 and 6) preventing backward rotation. Both the type wheels are moved, when released by the mechanism hereinafter to be described, controlled by the selecting fingers engaging with the punched holes in the card and they continue to move until stopped by the cam mechanism controlled by the clock work. The movement of the type wheels is caused by the movement of handle 5. The mechanism for operating these type wheels so that they are moved by mechanism connected with the handle is similar in the two cases. In the case of the minute wheel 9 its operating mechanism consists of a shaft 14 to which the type wheel 9 and its ratchet 13 are fast, spur gears 17, 17, bevel gears 18, 18 (Fig. 3), vertical shaft 87 (Fig. 9), beveled gears 85, 85 sleeve 84, spur gear 81. Gear 81 is driven through gear 177 shown in Fig. 14. The means for driving this latter gear will presently be described.

The hour wheel 8 and its ratchet wheel 12 are driven by gears 16, 16, (Fig. 3), one of which is secured to its hub, bevel gears 19, vertical shaft 88 (Fig. 9), bevel gears 21, shaft 83, spur gear 82. Gear 82 is driven by gear 203 (Fig. 14). The device for driving this gear will be presently described.

The driving gearing just described for rotating the minute and hour type wheels are operatively connected with the handle and its mechanism only when the corresponding selecting finger enters a hole in a time card. The devices for this purpose will now be described. The figures which show these devices particularly are Figs. 3, 6, 14, 16–21 and 25.

The movement of the selecting fingers across the card from left to right until they drop into their respective holes causes the movement of two cams, one for the minute mechanism and the other for the hour mechanism. When the selecting fingers drop into the holes in the card these cams are caused each to operate a pawl throwing the pawl into operative or driving connection one with the minute type wheel and the other with the hour type wheel. These two type wheels are then rotated until the pawls above referred to are thrown out of operative or driving position by disk cams connected with or controlled by the clock work. This causes the hour and minute type wheels to rotate a distance corresponding to the elapsed time between the time when the card was first inserted into the machine and the handle operated and the time when the same card was inserted into the elapsed time slot and the handle again operated. The particular devices shown in the drawings for causing the movement of these selecting fingers to move the cams for throwing the aforesaid pawls into operative position are as follows: Referring first to the minute type wheel mechanism and driving connections, selector arm 130 which has been already described, has been moved through link 148 and driven block 29 to a certain position depending upon the position of the hole punched in the card by the minute punch. Fast to selector arm 130 through crossover rod 128 is a sector 127 (see also Fig. 5) which turns pinion 176 fast on sleeve 271, which sleeve is loose on shaft 175. Fast on the other end of the sleeve 271 is an arm 189 and on it is riveted a cam 188 having a sloping cam surface on its extreme outer end (see Fig. 19). Arm 189 and its cam 188 are moved 180° or some point less than that depending upon the position of the hole punched in the card by the minute punch. When the minute selecting finger drops into the hole in the card arm 189 and cam 188 are arrested and held. 272 is a sleeve turning loosely on sleeve 271. At the right hand end of the sleeve, as viewed in Fig. 14, there is fast to the sleeve a ratchet wheel 187. On the other end of the sleeve is secured a gear wheel 177 meshing with gear 81 (Fig. 9) which drives the minute type wheel as already described. 206 is a gear wheel loosely mounted upon a hub 273 loosely turning on sleeve 272. This gear wheel meshes with and is driven by gear 163 and like gear 163 makes a complete revolution at each motion or movement of the handle.

Fast on one side of gear 206 is a plate 185 (Fig. 17) carrying a stud 274 upon which is pivoted a pawl 183. This pawl is composed of two parts 180 and 181 (Fig. 18) each loosely mounted on stud 274. These two parts of the pawl are frictionally held so as to move together except as described below. The two parts are held in the position shown in Fig. 18 by a spring 184. Pawl 183 carries a pin 182 projecting sidewise from it and lying normally on the sloping cam surface on the end of plate 188. As the handle is turned pin 182 on its pawl is rotated in the direction of the arrow (Figs. 16–18) making a complete revolution at each operation of the handle. Arm 189 with its plate and cam surface 188 are rotated in a similar direction and at the same speed so that pin 182 will during this rotation lie upon the sloping cam surface of plate 188. But when arm 189 is arrested, as above described, by a selector finger entering the punched hole, pin 182 in its further rotation is forced upward on the sloping cam surface 188 and this tips pawl 183 bringing its nose or pawl end (shown at the left in Fig. 18) into operative engagement with the teeth of ratchet wheel 187. There is one tooth on this ratchet wheel 187 for each tooth of the minute wheel. This starts the rotation of ratchet wheel 187 and through the connecting mechanism starts the rotation of the minute type wheel. The ratchet 187 and gearing continues to rotate until stopped by a cam controlled by the minute part of the clock movement. The devices used for these purposes are as follows: 178 is a gear which is driven from the minute part of the clock movement. This gear is fast on the hub 275 loose on sleeve 272 and on the same hub is securely mounted a disk cam 186 carrying two projecting cam surfaces 276. As pawl 183 rotates pin 179 will in the course of its movement through 180° or less, strike one of the cam surfaces 276. This will throw the pawl so that it is out of connection with the ratchet wheel 187. This will cause the minute type wheel to stop rotating. The pawl and its connecting parts will then continue and complete their rotation but the type wheel will remain in the position in which it has been stopped with the type representing the minutes of elapsed time between the two operations upon the printing line.

It will be noted that the sloping cam surface of plate 188 throws pawl 183 into operative position and the effect of the cam surface 276 of cam disk 186 is to throw the pawl out of operative position. It is possible that both of these cam surfaces, namely, 188 and 276, may strike pins 182 and 179 respectively at the same moment. For this reason and in order to prevent blocking of the machine it is necessary to make pawl 183 of two parts that are movable relatively to each other when pins 182 and 179 are struck by their cam surfaces at the same moment. Spring 184 permits both of these pins to be forced upward at the same time in which case a zero would be printed. In order to insure, under these circumstances, that pawl 183 is disengaged from ratchet wheel 187 the cam surface of cams 276 is made somewhat longer than the operative cam surface of plate 188 so that cam surface 276 will remain in operative contact with pin 179 longer than 188 will remain in contact with pin 182, thus insuring that pawl 183 will be felt out of operative engagement with ratchet 187. The ratchet teeth on gear 187 are sixty in number to correspond with the type of the minute wheel.

In the particular form of construction shown in the drawings the selecting devices will be moved upward immediately upon the beginning of their movement, should there be no card inserted in the slot. This would, of course, cause pawl 183 to engage at once with ratchet wheel 187 and would move the type wheel until arrested by a cam 276 in the manner already described. In order to guard against the printing of type we have arranged the printing mechanism so that it is not operative unless a card is inserted. In the case above cited, therefore, while the type wheels will be turned there will be no printing done.

In the form of construction shown in the drawings should a card be inserted without having had a hole previously punched in it, pawl 183 at the end of a movement of 180° would be thrown into operative position by pin 182 riding up on sloping cam surface of 188 inasmuch as the pawl completes a full revolution at each operation of the handle while arm 189 and its cam 188 only move 180° and there stop. In order to guard against this contingency we provide a projecting surface 277 on ratchet wheel 187. The nose of pawl 183 will lie opposite this surface at the expiration of a movement of 180°. Accordingly as pin 182 is forced upward it will simply stretch spring 184 without moving pawl 183 into operative position. Accordingly that pawl will remain in its outward or inoperative position all ready for the next operation.

The devices for moving the hour type wheel are substantially identical with those already described for moving the minute type wheel. They consist of the following: These parts are actuated from selector arm 129 already described. This arm is fast on shaft 125, at the other end is sector 126 engaging pinion 202 fast on a sleeve 278 loose on hub 279. Fast to the other end of sleeve 278 is arm 200 (corresponding to arm 189) and carrying cam plate 201. On sleeve 279 loose on shaft 175 is gear 203 meshing with pinion 82 (Fig. 9) which drives the hour type wheel as already described. On the inner end of hub 279 is the hour type wheel ratchet 193 (see Fig. 21) corresponding with minute type wheel ratchet 187. Lying next to the ratchet wheel is gear wheel 239 in engagement with gear 167 (corresponding with minute gear 163). Mounted on that gear is plate 196 (corresponding with 185). This plate carries a stud 280 upon which are mounted the two parts 197 and 198 of a pawl 208 which is provided with pins 195 and 199 (corresponding with pins 179 and 182) and has a spring 205. Up to this point the devices for imparting movement to the hour wheel to represent the elapsed hours in time are exactly similar to those operating the minute type wheel. Were the number of the minute of the time of insertion of the card into the elapsed time slot always larger than the number of the minute of the insertion of the card in the starting time slot, there would be no difference between the devices for operating the hour type wheel and those of the minute type wheel. But whenever the number of the minute of the time when the card is inserted in the elapsed time slot is less than that of the number of the minute when it was inserted in the starting time slot, it is, as is evident, necessary to subtract one from the number of hours. For this reason it is necessary to make the construction of the parts of the devices for operating the hour type wheel somewhat different from that of the corresponding parts for operating the minute type wheel, in order, in the case indicated, to make the length of travel of the hour type wheel one point less than it otherwise would be. This may be accomplished in any suitable manner. In the form shown in the drawings we accomplish it by means of the following devices: 194 (Fig. 20) is a ring gear corresponding to the minute gear 178. It meshes with gear 165 (Fig. 14) which is in train with the hour mechanism of the clock. A cam disk accompanies the ring gear 194 and supports it and fast to it is a plain disk 281, which is fast on hub 282 and rotates loosely on shaft 175 and has cams 219 (Fig. 20). These cams are exactly like cams 276 and operate in a similar manner. Loosely mounted on disk 281 are two subtractor cams 220 loosely mounted on pins 221. These subtractor cams are arranged immediately in front of the cams 219 and situated one point in front of them. Normally the subtractor cams are out of operative position, as shown in Fig. 20. In this position they will not strike pin 195, one of the cams 219 in that case striking pin 195 when it reaches it. The tail of each subtractor cam is provided with a pin 283 adapted to move in slot 284 formed in an arm fast to ratchets 191 and 190, having teeth pointing in opposite directions. Pawls 209 and 216 are adapted to engage with ratchets 190 and 191 respectively. Of course it will be understood that arms 192 and their two ratchet disks rotate with the gear 194. Pawls 209 and 216 are for the purpose of moving arm 192 to the left or right relatively to gear 194 so as to raise or depress the cam end of cam 220 and put it into or out of operative position. A spring 218 tends normally to hold pawl 216 against stop 217 and in engagement with ratchet 191 except when positively held out of engagement. Pawl 209 by its weight tends to move into engagement with ratchet 190 unless positively withheld. The devices for operating the two pawls consist of the following. Normally pawl 209 is out of engagement with ratchet 190 as shown in Fig. 20. Whenever the minute pawl 183 after being thrown into down or operative position by the minute selecting finger entering the punched hole in the card moves past the point 222 of lever 212 (Fig. 18) while still in its down position, it strikes cam surface 222 pushing it outward and rocking lever 212. It will be noted that pawl 183 will be in its down position at this point, unless it has encountered a minute cam between the time the selecting finger has dropped into the punched hole and the expiration of the minute in which this has taken place. In that case it is necessary to subtract one from the hours that would otherwise be represented by the movement of the hour wheel and be printed upon the card. Should pawl 183, however, be in its up position in passing point 222 of lever 212 its cam surface 207 will not engage with point 222. When cam surface 207 does engage with surface 222 lever 212 is rocked on its stud 213. 210 is a lever loosely mounted on stud 213 and connected by a spring 285 with lever 212. Lever 210 carries on its upper end pawl 209. When cam surface 207 rocks lever 212 spring 285 throws lever 210 and pawl to the left, as viewed in Fig. 20, bringing pawl 209 into operative engagement with ratchet 190. The spring 285 is to permit pawl 209 to give if necessary. The effect of this operation is to throw cams 220 into operative position a point in front of cams 219. One of the cams 220 will then strike pin 195 instead of one of the cams 219 striking it. This will arrest the movement of the hour type wheel one point or hour sooner than it would have been arrested had cams 220 not been thrown into operative position. In this way one is subtracted from the movement of the hour wheel. Pin 211 fast to the framework pulls pawl 209 out of operative engagement with ratchet 190 when lever 210 is in its down position. The tail of pawl 209 is so shaped as to coöperate with pin 211 to this end. Spring 286 secured to lever 210 and to stud 211 normally hold the parts in the positions shown in Figs. 18 and 20.

Cams 220 are returned to their normal inoperative position at the close of the operation of the machine through pawl 216 (normally out of engagement as shown in Fig. 20). This is accomplished through a rock shaft 214, operated through mechanism connected with the operating handle, as will be presently described. At the close of the operation it is rotated in the direction of the movement of the hands of a clock slightly lifting lever 215 fast to the shaft. Pawl 216 is pivoted to this lever and tends to move to the right through the operation of spring 218. Pin 217 fast to the framework normally holds pawl 216 out of engagement. When the pawl is raised through the movement of the rock shaft and the arm 215 a cut-away portion 287 in the pawl 216 permits the pawl to move inward into engagement with ratchet 191 and the upward movement moves ratchet wheel and arm 192 so as to bring the cams 220 into their inoperative position ready for the next operation.

The hour and minute type wheels have now been moved so as to bring upon the printing line the hour and minute representing the elapsed time between the time when the card was inserted in the starting time slot and the handle operated and the time when it was subsequently inserted into the elapsed time slot and the handle again operated. For purposes of illustration Fig. 22 represents the time when the card was inserted in the starting time slot and the handle operated, namely, 7.19 a. m. The clock in Fig. 1 represents the time when the card was inserted in the elasped time slot and the handle operated, namely, 10.06 a. m. The lapsed time in this instance is two hours and fortyseven minutes and Fig. 23 represents this time as printed on the time card. In this instance it will be noted that the subtractor cams were used. In this illustration the hour cam at the time when the elapsed time was taken was of course standing at ten o'clock and the hour cam when the starting time was taken stood at 7 o'clock. If it had not been for the subtracting feature the time printed would have been three hours instead of two.

The numbers standing on the printing line on the hour and minute type wheels are next printed upon the card in the spaces left for them, as shown in Figs. 22 and 23. The mechanism for effecting this printing will now be described.

*Printing mechanism.*—These are especially illustrated in Figs. 3, 8, 10, 11 and 12. 99 is a cam fast on shaft 89 (see Fig. 10). When handle 5 is pulled downward shaft 89 and cam 99 rotate in the direction of the arrow shown in Fig. 10. After handle 5 has moved downward for some considerable distance cam 99 in the ordinary operation of the machine will strike the curved surface of rock lever 98 pivoted on stud 101 secured to the framework. 97 is the other end of the bell-crank lever 98. Loosely pivoted on this lever is a tripping pawl 94 normally held by spring 96 in the position shown in Fig. 10 with its nose over finger 93, fast on shaft 92. 92 carries the hammer arms and hammers 288 secured to an ordinary knee joint 236 on rock lever 235 fast on shaft 92.

The hammers and connecting parts are normally in the position shown in Fig. 3. When cam 99 strikes rock lever 98 it rocks it, pulling trip 94 and finger 93 downward rocking shaft 92 and rock lever 235 and the hammer arms downward. The lower end of trip 94 moves downward nearly in a vertical line and soon strikes a sleeve 289 loose on shaft 89. This causes trip 94 to disengage from finger 93 whereupon the hammer arms are thrown rapidly upward by spring 103 fast on arm 290 secured to shaft 92 and secured at the other end to the framework of the machine. This causes a sudden blow to be given effecting the printing in a legible manner. The return movement of shaft 92 and lever 235 is arrested by the latter striking the casing of the machine. This is the ordinary operation of the printing mechanism when a card has been duly inserted in the elapsed time slot. In case, however, a card has not been introduced at all it is desirable that the printing mechanism be not operated at all. We have shown the following devices for preventing the operation of the printing mechanism in that case. As shown, it consists of the following devices: 90 is a finger mounted on sleeve 289. Sleeve 289 is mounted with shaft 89 by means of spring 91 connected to both parts. Ordinarily the movement of shaft 89 will rotate sleeve 289 and move finger 90 upward until it comes into contact with the under side of the card, as shown in Fig. 11. This takes place just before cam 99 comes into contact with lever 98. If a card has been inserted finger 90 moves against its lower surface and is arrested by that time and with it are arrested the rotary movement of sleeve 289 and cam 100 fast on this sleeve. Cam 100 is in line with the pawl end of trip 94. With a card in the slot, as shown in Fig. 11, cam 100 does not strike or interfere with the action of trip 94 and the printing is effected as already described. If no card, however, was inserted in the slot or is not inserted far enough back finger 90 will continue its movement as shown in Fig. 12 bringing cam 100 under and into contact with the pawl end of trip 94 and thus removing trip 94 from contact with finger 93 before trip 94 has begun to rock finger 93 and shaft 92. Of course spring 91 must be considerably stronger than spring 96 to effect the operation of the parts as described. In the above way the printing hammers are not retracted unless a card is inserted in the slot or inserted sufficiently far. By shifting the upper point of finger 90 so that it will strike the extreme inner end of the card when thrust inward to its uttermost limits printing can be prevented except when the card is inserted to its full length.

291 is a bell and 292 a hammer mounted upon shaft 92. This is so adjusted that when a printing blow of the hammers is given the bell will be struck. If desired a similar bell can be mounted in connection with the punching mechanism to indicate to the operator that he has properly punched the holes in his card when the card is inserted in the starting time slot.

The inking ribbon mechanism is illustrated in Figs. 3, 4, 7 and 8. Any suitable inking ribbon fed mechanism may be employed. That shown consists of an arm 46 fast on the sleeve of crank arm 68, already described, and provided with a link 44 connecting it with link 294 carrying pawl 43 in the usual manner, the latter engaging with a ratchet 42 fast on shaft 69 which carries at one end a crown gear 39 adapted to mesh with a similar gear 39 on shaft 41. Shaft 69 is provided at its other end with a similar gear meshing with gear 40 on a similar shaft 41. It also has an impositive lock 45 for holding it in either position. As shown, the left hand gear on shaft 69 is in mesh with gear 40 and out of mesh with gear 39 on shaft 41. As shown the inking ribbon 295 is being fed to the left as viewed in Fig. 4 at each operation of the handle. Any suitable means may be provided for reversing the direction of feed. That shown consists of a clutch arm 37 working in groove 38 on shaft 69. The inking ribbon is provided with a button at either end, one of which, 293 at one end only is shown. 31 and 32 are two rocking arms mounted at 35 and 36 and connected by link 27. On arm 32 is a roller 33 engaging one or the other of two sloping surfaces on the end of spring arm 34. When button 293 strikes arm 32 and forces it to the left, as viewed in Fig. 4, roller 33 rides up the sloping surface of spring arm 34 causing clutch 37 to jerk to the right to throw shaft 69 to the right causing crown gears 39 to mesh and separating crown gears 40 and also causing the impositive spring to jump into the adjoining groove. The feed is now in the opposite direction. A similar operation takes place when the ribbon reaches the other extreme limit of its movement. Spring 296 provided with the adjusting nut 297 are ordinary means for giving tension.

*Clock mechanism and driving gears.*—These are especially illustrated in Figs. 2, 3 and 4. Any suitable form of clock movement and driving connections for operating the clock disk cams may be employed. The clock movement may, if desired, be made powerful enough to drive any or all of the different parts of the mechanism of our improved device. We prefer, however, to have the operative parts of the machine driven from the handle or other operating means. In this way we obtain more certain and accurate and reliable results. A lighter clock movement may be employed and the clock movement itself is thereby made more accurate and reliable. In the particular form of our improvement shown in the drawings the clock movement drives nothing but the various stop cams. This work is very light and requires but little power.

The particular devices shown consist of a clock work 7 which may be of any desired construction. As shown, it is connected by a flexible shaft 298 carrying bevel gear 300 meshing with bevel gear 301 on shaft 302. Fast on shaft 302 is gear 50 which rotates once an hour and which meshes with gear 156 already described. This operates the minute stop cams. The hour stop cams are operated by a train of reducing gears 51, 52, 53 and 55. Gears 52 and 53 are fast on shaft 54. Gear 55 rotates once in twenty-four hours and meshes with the hour stop cams.

The handle and various parts of the mechanism are returned to their normal or original position by means of spring 102 connected to the side frame of the machine and the crank arm 104 on shaft 89.

304 and 305 are springs secured to the frame work and to bell cranks 62 and 61 respectively for returning the bell cranks and connecting parts to their original positions when permitted by cams 66 and 65.

The type wheels and connecting parts normally are returned to their positions at the last instant of the upward movement of handle 5 by crank arm 46 striking wire 47 secured to shaft 49 lifting the two pawls 48 out of engagement with the ratchets 12 and 13. This permits the type wheels and their connecting gearing to return to their zero or original position. In the position of the machine at rest the pawls 48 are held out of engagement with ratchets 12 and 13. They are thrown into engagement at the very first operation of the handle being pulled down by springs 303 the moment crank arm 46 permits.

The selecting fingers are returned to their original position by the return of the links 70 and 71 causing the driving arms and blocks to go back forcing the driven blocks and selecting fingers to return to their original position.

306 is a sloping surface (see Fig. 3) formed in the framework surrounding the slot on the left. The object is to cause the selecting fingers 133 and 134 to strike the sloping surface and be forced downward and out of the path of the card in the slot. Otherwise in the machine shown it would be impossible to insert a card into the slot.

The subtractor cams 220 are restored to their normal or inoperative position as already described above by a slight rebound of shaft 214 to the right as viewed in Fig. 20. This is accomplished by cam 65 striking bell crank 73 (Fig. 5) moving the other arm of the bell crank to the right as viewed in Fig. 5 against the spring 76 pulling rod 77 to the right. Rod 77 is secured to arm 306 (Fig. 5) on rock shaft 214. The purpose of spring 76 is to make a flexible connection between 74 and the parts it drives so that if cams 220 are in their down position the spring will take up the movement. This is accomplished by causing rod 77 to pass through an opening in arm 74 and placing spring 76 between the arm 74 and a head secured at the right end of rod 77 so that the pressure exerted on rod 77 passes through the spring.

It is evident that, as the clock stop cams are driven continuously by the clock movement, they will be driven during lunch hour and at other times when the operator is not working and a record is not desired. If desired, a device may be employed for stopping the operation of the clock stop cams during such interval. Any devices may be employed for this purpose. In Figs. 26 and 27 we show our preferred form for accomplishing this purpose. In these devices the clock movement and the clock stop cams are operatively disconnected, as for example, during the lunch hour. The particular devices shown for the purpose consist of the following: On gear 229 is mounted a cam 307 adapted to engage a pin 308 on an arm 225 pivoted at 309 in a bracket in the frame work 230 and carrying at its other end a pawl 226 engaging ratchet 227 mounted on a shaft 228 mounted loosely in the frame work and carrying with it a disk 233 provided with two cam surfaces 234. Of course any number of cams can be mounted on this disk to suit the circumstances of the case. 231 is an arm pivoted at 311 and normally pressed by spring 310 so that its nose rests against disk 233, which is secured to a sleeve on shaft 302 carrying one member of a clutch 232. As cam 307 turns once every hour disk 233 is fed forward one point at the end of each hour. When a cam surface 234 comes opposite the nose on arm 231 it separates the clutch faces, thus separating the clock movement from the clock stop cams. The latter remain at rest so long as cam 234 is in contact with the nose on arm 231. By properly proportioning cams 234 and 307 any interval of time desired may be subtracted. By varying the position of cams 234 on disk 233 the intervals subtracted may occur at any time during the day or night. Where such stopping devices are employed we preferably employ a card without a scale, as shown in Fig. 24. If desired a scale may be employed but in that case the time, during which the clock cams are disconnected from the clock movement, must also be omitted from the scale, or the latter will not correctly represent the starting time.

The type wheels and the matter printed by them may, if desired, represent other things than time, such for instance, as money values, and by suitable changes this can be done in any denomination of money. It is, of course, also evident that instead of having an hour and minute wheel a minute and second type wheel can be employed if desired, so likewise with suitable changes an hour, minute and second wheel can be employed.

In the machine already described the clock cams are driven directly from the clock-work by means of compound gearing, the ratio of the gearing shown being 1 to 24. With such an arrangement little or no back lash can be permitted as the pawls must be sensitive to a minute movement, that of 1/1440th part of a circumference. To avoid this and to reduce the cost we have devised the modified arrangement shown in Figs. 28, 29 and 30, which we will now describe. Shaft 299 is connected to the clock gearing as before described. It drives gear 300 which is in mesh with gear 301. Fast on the hub of gear 301 is the alining wheel 310 which has secured to its side the spiral cam 311. Preferably this cam is made so as to be capable of slight circumferential adjustment. Also fast on the hub of gear 301 is the spur gear 156 which has secured to it the minute disk cam 157. As gear 301 revolves (once every hour), cam 311 raises lever 325 (Fig. 30) fast on shaft 318 and thus raises another lever 335, also fast on shaft 318. Lever 335 carries a pawl 313. At the end of each hour, lever 325 drops off cam 311 and with it falls lever 335. The latter lever is weighted at 317 to insure this dropping. The nose 323 of pawl 313 is thus brought into engagement with notched wheel 315. This wheel is normally locked by tooth 321 on lever 312 pivoted at 320, spring 319 tending to hold the parts in locking position. The slightest forward motion of pawl 313 causes a pin 322 on lever 312 to ride up on the cam surface at 323 and unlocks wheel 315. Pawl 313 now turns wheel 315 until pin 322 has passed by the upper end of cam surface 323 whereupon wheel 315 is again locked. Piece 324 on the side of lever 325 drops in between the teeth of wheel 315 in the movement of the parts described above to aid in, the arrest of the movement of wheel 315 and take the shock of such arrest off of the slender pawl 313. Wheel 310 is alined by lever 327 which is provided at its end with an alining tooth. Any suitable means may be provided for operating lever 327. As shown a spring 326 tends to move it into alining position and it is held out of alining position by means of a rod 329 pivoted to arm 330 fast on shaft 328, to which shaft 327 is secured. Rod 329 is moved to the left for this purpose by a cam (not shown). The parts are so arranged that as soon as handle 5 begins its movement, lever 327 alines wheel 310 and just before lever 5 returns to its normal position, lever 327 is moved out of engagement with wheel 310. 333 and 334 are spring washers which are used for friction purposes.

Wheel 315 (Fig. 28) is secured to hub 331 which has fast at its other end, gear 165 carrying hour disk cam 166.

By means of our improvement elapsed times of any number of operators may be taken upon the same machine and as rapidly as cards can be inserted and the handle be operated; and this wholly irrespective of the order in which said cards are inserted and whether inserted for placing the starting time identification marks on the cards or printing the elapsed time thereon. By it cheap, convenient and absolutely accurate and reliable means are provided for keeping a record of elapsed times. No calculation whatever is required in arriving at the elapsed times. They are printed by the machine and only need to be read.

In the machine shown the power used to drive the various parts of the mechanism, except the clock stops, is supplied by the operator through the movement of the handle. It will be understood of course that any other suitable source of power may be employed or power may be obtained, if desired, from the clock movement or the power derived from the operator may be applied by another suitable mechanism than through the handle and its connections shown in the drawings. Likewise any suitable medium may be employed adapted for receiving the starting time marks and the term card, as employed herein is used by us in a broad sense to include any such suitable medium, whether made of paper or any other suitable material, and whether commonly known as a card or not, the only requisite being that it is capable of receiving the starting time marks. Similarly the starting time marks may be anything capable of being recognized or identified by the selecting devices. Thus they are not limited to holes punched through the body of the card or to cuts made in other parts or places of the card, as for example, in an edge thereof, but may be projecting parts formed by adding other material to the card or by turning up parts thereof, or they may be any marks suitable for the purpose.

We prefer to provide the card with a scale or scales, as shown, but this is not essential.

One or any number of devices may be employed for placing the identification starting marks on the card or its equivalent. In the machine shown there are employed two such devices, viz: the minute punch and the hour punch and their connecting parts. Each of these devices is shown as movable over the card, although under certain circumstances and with suitable modifications the card might be made movable relatively to such device.

In the machine shown the indicating mechanism is in the form of printing typewheels. They may however, if desired, assume any other form of printing mechanism or indicate in any other suitable way than by printing. As shown, the indicating devices consist of two type-wheels. Of course one or any suitable number of indicating devices may be employed, as desired.

The devices coöperating with and controlled by the time marks on the card to move or control the operation of the indicating mechanism in the machine shown herein consist of selecting fingers and their connections. But any other suitable form of controlling devices may be used, as desired, the only requisite being that they be capable of coöperating with and being controlled by the time marks on the card and thus of starting or controlling the operation of the indicating mechanism.

The stops for stopping the indicating mechanism which we preferably employ, are cams mounted on disks controlled by the clock movement. But any stop mechanism may be used suitable for the purpose.

We have preferably shown the card receptacle as consisting of two separate and distinct slots; although this is not essential, as with suitable modifications a single slot or any number might be employed.

It will be understood, of course, that many departures from or changes or modifications in or additions to, the mechanism shown in the drawings, could be made without departing from our invention.

What we claim as new, and desire to secure by Letters Patent, is:—

1. The combination of a clock movement, a card, a device, controlled by the clock movement, for placing on the card a starting time mark, an elapsed time indicating mechanism, means for operating such mechanism, a device, controlled by the starting time mark, adapted to control the operation of the elapsed time indicating mechanism, and a stop for stopping the elapsed time indicating mechanism controlled by the clock movement.

2. The combination of a clock movement, a card, a device for placing on the card a starting time mark, a stop device, actuated by the clock movement for controlling the said device, an elapsed time indicating mechanism, means for operating such mechanism, a device, controlled by the starting time mark, adapted to control the operation of the elapsed time indicating mechanism, and a stop for stopping the elapsed time indicating mechanism controlled by the clock movement.

3. The combination of a clock movement, a card, a punch, controlled by the clock movement, for punching a starting time hole in the card, an elapsed time indicating mechanism, means for operating such mechanism, a selecting finger adapted to take into the said hole punched in the card, adapted to control the elapsed time indicating mechanism, and a stop, controlled by the clock movement, for stopping such time indicating mechanism.

4. The combination of a clock movement, a card, a punch adapted to be movable over the card, a stop controlled by the clock movement for stopping the said punch, means for operating the punch to cause it to punch a hole in the card, an elapsed time indicating mechanism, means for operating such mechanism, a selecting finger adapted to take into the said hole punched in the card, adapted to control the elapsed time indicating mechanism, and a stop, controlled by the clock movement, for stopping such time indicating mechanism.

5. The combination of a clock movement, a card, a punch adapted to move over the card, a cam controlled by the clock movement for stopping the movement of said punch, means for operating the punch to cause it to punch a hole in the card, an elapsed time indicating mechanism, means for operating such mechanism, a selecting finger adapted to take into the said hole punched in the card, adapted to control the elapsed time indicating mechanism, and a stop, controlled by the clock movement, for stopping such time indicating mechanism.

6. The combination of a clock movement, a card, a punch movable over the card until stopped by a stop controlled by the clock movement, means for operating said punch to punch starting time holes in the card, an elapsed time indicating mechanism, means for operating such mechanism, a selecting finger adapted to take into a hole punched in the card, adapted to control the elapsed time indicating mechanism, and a stop, controlled by the clock movement for stopping such time indicating mechanism.

7. The combination of a clock movement, a card, a device, controlled by the clock movement, for placing on the card a starting time mark, an elapsed time type mechanism, printing hammers for causing the type mechanism to print upon the card, a device, controlled by the starting time mark, adapted to control the elapsed time type mechanism, and a stop controlled by the clock movement for stopping the type mechanism.

8. The combination of a clock movement, a card, a device, controlled by the clock movement, for placing on the card a starting time mark, elapsed time type wheels, means for operating said type wheels, printing hammers for causing the type wheels to print upon the card, a device, controlled by the starting time mark, adapted to control the starting of said type wheels, and a stop controlled by the clock movement for stopping them.

9. The combination of a clock movement, a card, a device controlled by the clock movement, for placing on the card a starting time mark, an elapsed time indicating mechanism, normally inoperative, means for operating such mechanism, a device, controlled by the starting time mark, adapted to control the starting of the elapsed time indicating mechanism, and a stop controlled by the clock movement, for stopping the indicating mechanism.

10. The combination of a clock movement, a card, a device, controlled by the clock movement, for placing on the card a starting time mark, elapsed time indicating mechanism, means other than the clock movement for driving such mechanism, a device, controlled by the starting time mark, adapted to control the starting of the elapsed time indicating mechanism, and a stop, controlled by the clock movement, for stopping said mechanism.

11. In an elapsed time indicating machine elapsed time indicating mechanism, means for controlling one limit of its elapsed time indicating operation in accordance with the time of a first operation and means for controlling the other limit of said operation in accordance with the time of a subsequent operation.

12. The combination of a clock movement, a card, devices, controlled by the clock movement, for placing on the card starting time marks, elapsed time indicating mechanism consisting of an hour and minute type wheel, means for operating said wheels, devices, controlled by the starting time marks, adapted to control the starting of the hour and minute type wheels, and stops, controlled by the clock movement, for stopping said wheels.

13. In an elapsed time indicating machine elapsed time indicating mechanism, means for controlling it as to one limit of its elapsed time indicating operation on one operation of the machine in accordance with the time of such operation and means, controlled by a time mark on a card representing a prior time for controlling the indicating mechanism as to the other limit of its operation.

14. The combination of a clock movement, a card, a device, controlled by the clock movement, for placing on the card a starting time mark, elapsed time indicating mechanism, a handle for operating the said mechanism, a device also operated by the handle, but controlled by the starting time mark, and adapted to control the starting of the elapsed time indicating mechanism and a stop, controlled by the clock movement, for stopping such mechanism.

15. In an elapsed time recorder the combination of a clock controlled marking device adapted to make a preliminary mark upon a record surface, and an elapsed time recording means adapted to be controlled by said preliminary mark in making its elapsed time record.

16. In an elapsed time recorder the combination of a clock controlled marking device adapted to make a preliminary mark upon a record surface, a device adapted to coöperate with said preliminary mark, and elapsed time recording means adapted to be controlled by said preliminary mark through its coöperating device.

17. The combination of a clock movement, a card, punches adapted to move over the card, cams operated by the clock for limiting said motion, elapsed time type wheels, means for operating said type wheels, printing hammers for causing the type wheels to print upon the card, selecting fingers adapted to take into the holes formed by the punches, cams for stopping the type wheels controlled by the clock movement, and a handle for operating all of the above devices except the clock cams.

18. In an elapsed time recording machine elapsed time recording mechanism, clock-controlled means for controlling it as to one limit of its elapsed time recording operation and means for controlling it as to its other limit controlled by a time mark on a card representing a prior time.

19. In an elapsed time recording machine the combination of elapsed time recording mechanism, means representing a prior time for controlling the recording mechanism as to one limit of its elapsed time recording operation, and means representing a later time for controlling the recording mechanism as to the other limit of its recording operation.

20. The combination of a clock movement, a card, punches adapted to move over the card to punch starting time holes therein, cams controlled by the clock movement for limiting such movement of the punches, elapsed time indicating mechanism, means for operating it, selecting fingers adapted to take into said holes, an operating handle, means for moving such selecting fingers consisting of a driving and driven part, the driving part being operated by the handle to make the same movement at every operation, and the driven part stopping when its selecting finger takes into a hole, a clutch adapted to operatively connect or disconnect the elapsed time indicating mechanism and its operating means and so connected with the driven part of the selecting-finger moving means that, when the said driven part stops, the clutch will operatively connect the operating means with the indicating mechanism, and thereby start the indicating mechanism and stops adapted to disconnect the clutch and the indicating mechanism controlled by the clock movement.

21. In a machine for indicating elapsed time, the combination with elapsed time indicating mechanism of a device adapted to be controlled by a time mark on a card to limit the movement of the elapsed time indicating mechanism in its indicating operation, and a card provided with such a time mark.

22. The combination of elapsed time recording mechanism, a time mark on a card representing a prior time, a device, adapted to be controlled by the time mark, for controlling the elapsed time recording mechanism as to one limit of its elapsed time recording operation.

23. The combination of elapsed time recording mechanism, a time mark on a card representing a prior time, a device, controlled by the time mark on the card, for controlling the starting of the recording mechanism in its elapsed time recording operation.

24. In a machine for indicating elapsed time, the combination of a clock movement, a punch for punching starting time holes in a card adapted to move over the card, means for moving the punch over the card, and a stop controlled by the clock movement for limiting such motion.

25. In a machine for indicating elapsed time, the combination of a clock movement, hour and minute punches, adapted to move over a card to punch starting time holes representing the hour and minute, means actuated by the operator for moving the punches over the card, cams controlled by the clock movement for limiting the movement of said punches, and means for operating the punches to punch holes in the card.

26. In a machine for indicating elapsed time the combination of a clock movement and indicating mechanism adapted to be controlled in its starting by means of starting time marks on a card, a card provided with such a mark, and a stop controlled by the clock movement for stopping such indicating mechanism.

27. In a machine for recording elapsed time, the combination of a clock movement, elapsed time type mechanism, means for moving such mechanism in its elapsed time indicating operation, controlled as to its time of starting by a mark on a card representing the time of a prior operation of the machine, a card provided with a mark representing such prior time, a stop controlled by the clock movement for stopping such type mechanism, whereby the type indicating the elapsed time will be brought upon the printing line, and a platen for forcing the card and type mechanism together for printing the elapsed time on the card.

28. In a machine for recording elapsed time the combination of a clock movement, an elapsed time hour type wheel and an elapsed time minute type-wheel, means for moving the hour and minute type-wheels in their elapsed time indicating operation controlled as to its time of starting by a mark on a card representing the time of a prior operation of the machine, a card provided with a mark representing such prior time, a stop for each type-wheel controlled by the clock movement for stopping said type-wheel, whereby type upon the hour and minute type-wheels representing the hour and minute of the elapsed time will be brought upon the printing line, and a platen for forcing the card and type-wheels together for printing the hours and minutes of elapsed time on the card.

29. In a machine for indicating elapsed time, the combination of a clock movement, indicating mechanism, means other than the clock movement for driving such indicating mechanism and adapted to be set into operation by means of starting time marks on a card, such a card provided with a mark representing the time of a prior operation of the machine, and a stop controlled by the clock movement for stopping such indicating mechanism.

30. In a machine for indicating elapsed time, the combination of a clock movement, elapsed time indicating mechanism driven from an operating handle, an operating handle, a device adapted to control the indicating mechanism in accordance with the time of a prior operation of the machine, and a stop controlled by the clock movement for stopping such indicating mechanism.

31. In a machine for indicating elapsed time the combination with elapsed time indicating mechanism of a device adapted to be controlled by a starting mark on a card to control the starting of the elapsed time indicating mechanism into operation, and a card provided with such a mark.

32. In a machine for indicating elapsed time the combination with elapsed time indicating mechanism of a selecting finger adapted to take into a hole in a card to control the starting of the elapsed time indicating mechanism into operation, and a card provided with such a hole.

33. In a machine for indicating elapsed time, the combination with elapsed time indicating mechanism of a clock movement, a selecting finger adapted to be operated by means other than the clock movement and to take into a hole in a card to control the starting of the elapsed time indicating mechanism into operation, and means other than the clock movement for operating the selecting finger, and a card provided with such a hole.

34. In a machine for indicating elapsed time, the combination of a clock movement, a selecting finger adapted to take into a starting time hole in a card, a card provided with such a hole, means for operating the finger composed of two parts, a driving and a driven portion, the former communicating motion to the latter and the two being detachably connected, the driven portion being connected with the finger, and elapsed time indicating mechanism connected with the driven portion, whereby, when the finger takes into a hole in the card the driving and driven portions will be detached, the former completing its full movement and the latter stopping and thereby controlling the starting into operation of the indicating mechanism.

35. In a machine for indicating elapsed time, the combination of a clock movement, a selecting finger adapted to take into a starting time hole in a card, means for operating the finger, means other than the clock movement for driving such means and composed of two parts, a driving and a driven portion, the former communicating motion to the latter and the two being detachably connected, the driven portion being connected with the finger, and elapsed time indicating mechanism, means other than the clock movement for driving such indicating mechanism and connected with the driven portion, whereby, when the finger takes into a hole in the card the driving and driven portions will be detached, the former completing its full movement and the latter stopping and thereby controlling the starting into operation of the indicating mechanism, and a stop controlled by the clock movement for stopping the indicating mechanism.

36. In a machine for indicating elapsed time, the combination of a clock movement, a starting time device, an elapsed time indicating mechanism adapted to indicate the elapsed time between two operations of the machine and controlled by the clock movement at one limit of its elapsed time indicating movement and by the starting time device at the other limit.

37. An elapsed time indicating device having variable limits to its elapsed time operation and a time device, representing the time of a prior operation, adapted to control the indicating device as to one limit of its indicating operation.

38. An elapsed time indicating device having variable limits to its elapsed time operation and a card provided with a time mark representing the time of a prior operation, adapted to control the indicating device as to one limit of its indicating operation.

39. In a machine for indicating elapsed time, the combination of elapsed time indicating mechanism, a device controlled by starting time marks on a card to control the starting of the indicating mechanism and provided with two engaging surfaces, normally in engagement and moving with each other, one adapted to be continuously driven during the operation of the machine and the other to stop when the device encounters a mark in the card and thereby to move the first surface so as to throw the indicating mechanism into operation, and a card provided with such a mark.

40. In a machine for indicating elapsed time, the combination of a clock movement, elapsed time indicating mechanism, a device controlled by starting time marks on a card and a device adapted, when actuated by the said first mentioned device, to control the setting of the elapsed time indicating mechanism into operation, and a stop, controlled by the clock movement, to stop said indicating mechanism.

41. In a machine for indicating elapsed time, the combination of a clock movement, elapsed time indicating mechanism, a device controlled by starting time marks on a card, a card provided with such marks, a device adapted, when actuated by the said first mentioned device in one direction, to throw the elapsed time indicating mechanism into operation, and, when actuated in the other direction by stop mechanism controlled by the clock movement, to stop said indicating mechanism, and stop mechanism for actuating said device in said other direction, whereby if the said device is simultaneously actuated in both directions at the same time, the indicating mechanism will not be operated and blocking of the parts will be avoided.

42. In a machine for indicating elapsed time, the combination of elapsed time indicating mechanism, a device controlled by starting time marks on a card to control the starting of the indicating mechanism and provided with two engaging surfaces, normally in engagement and rotating with each other, one adapted to be continuously rotated a complete revolution at each operation of the machine and the other adapted to stop, when the device encounters a mark in the card and thereby to move the first surface so as to throw the indicating mechanism into operation but to stop at a half revolution if no card is inserted in the machine, and a device adapted to be actuated in the latter case to prevent the starting into operation by the first surface of the in dicating mechanism if no card is inserted, and a card provided with such time marks.

43. The combination of an elapsed time indicating mechanism controlled at one limit of its elapsed time indicating operation by time marks on a card representing prior time and at its other limit by a clock-controlled stop, a card provided with such time marks, a stop driven by a clock movement and representing time, a clock movement, and a clock-controlled cut-out device for operatively disconnecting the clock and the stop for a predetermined period of time.

44. In an elapsed time recording machine elapsed time type wheels normally at zero, adapted to be started in their elapsed time operation by a time hole on a card representing the time of a prior operation, and adapted to be stopped by a clock-controlled cam, a card provided with such a hole, and a clock-controlled cam for stopping the elapsed time type wheels.

45. The combination of a clock movement, a device controlled by the clock movement, for placing on a card a starting time mark, a card provided with such a time mark, elapsed time indicating mechanism, means for operating it, a device controlled by such marks on the card to control the starting of the indicating mechanism into operation, a stop, controlled by the clock movement, for stopping elapsed time indicating mechanism, and a cut-out device, controlled by the clock movement for disconnecting the stop from the clock movement for a predetermined period of time.

46. The combination of a clock movement, a device controlled by the clock movement, for placing on a card a starting time mark, a card provided with such a time mark, elapsed time indicating mechanism, means for operating it, a device, controlled by such marks on the card to control the starting of the indicating mechanism into operation, a stop, controlled by the clock movement, for stopping said indicating mechanism, a clutch connecting said stop with the clock movement, and a cam driven continuously by the clock movement for disconnecting the stop from the clock movement for predetermined periods of time.

47. The combination of a clock movement, a device controlled by the clock movement, for placing on a card a starting time mark, elapsed time indicating mechanism, means for operating it, a device, controlled by such marks on the card to control the starting of the indicating mechanism into operation, a stop, controlled by the clock movement, for stopping said indicating mechanism, a clutch connecting said stop with the clock movement, and an adjustable cam driven continuously by the clock movement for disconnecting the stop from the clock movement for predetermined periods of time.

48. In a machine for indicating elapsed times, the combination of elapsed time indicating mechanism standing normally at zero, a starting time device adapted to control the starting of the elapsed time indicating mechanism, and a stop, controlled by a clock movement for stopping such mechanism, whereby elapsed time will be added to zero upon the elapsed time indicating mechanism and will be indicated thereby.

49. In a machine for indicating elapsed times, the combination of elapsed time indicating mechanism standing normally at zero, means for operating such elapsed time indicating mechanism, a starting time device adapted to be actuated by a starting time marked on a card to connect the operating means and the elapsed time indicating mechanism to control the starting of the latter into operation, and a stop controlled by a clock movement for stopping such mechanism, whereby the elapsed time will be added to zero upon the elapsed time indicating mechanism, and will be indicated thereby.

50. The combination of elapsed time indicating mechanism of a higher and lower denomination of time, a card provided with time marks representing the time in both denominations of a prior operation, devices, one for each denomination of time, each adapted to be actuated by its mark on the card and adapted to be connected to and to control the elapsed time indicating mechanism of its denomination as to one limit of its elapsed time indicating operation in accordance with the location of the said mark on the card, a device for subtracting one from the indicating mechanism of the higher order, and means for operating the card-actuated devices so arranged that the card-actuated device of the lower denomination will be operated before that of the higher denomination in order to permit the subtracting device to become operative to affect the indication of the elapsed time indicating mechanism of higher order.

51. The combination of a clock movement, a device, controlled by the clock movement, for placing on a card a starting time mark arranged thereon in reference to a time scale marked thereon, to indicate the said starting time by the location of the mark relative to the scale, an elapsed time indicating mechanism, means for operating such mechanism, a starting time device, controlled by the starting time mark, adapted to control the operation of the elapsed time indicating mechanism, and a stop for stopping the elapsed time indicating mechanism controlled by the clock movement.

52. The combination of mechanism for printing upon a card, operating mechanism for actuating the printing mechanism, a receptacle for the card, and a device for preventing the operating mechanism when it is actuated, from actuating the printing mechanism unless a card is inserted into the receptacle.

53. In an elapsed time indicating machine the combination of elapsed time indicating mechanism having variable limits to its elapsed time operation and devices for limiting the extent of the elapsed time movement of said mechanism, one of said devices clock-controlled and another of said devices controlled by a device representing the time of a prior operation of the machine.

54. In a machine for indicating elapsed time, the combination of elapsed time indicating mechanism and a device adapted to control said elapsed time indicating mechanism in accordance with the time of a prior operation of the machine.

55. The combination of mechanism for printing upon a card, a receptacle for the card, operating mechanism for actuating the printing mechanism, a device for preventing the operating mechanism, when it is actuated, from actuating the printing mechanism, flexibly connected with and actuated by the driving mechanism of the machine and normally operative but restrained from operation by a card when properly inserted in the receptacle.

56. The combination of a printing hammer for printing upon a card, a spring for delivering a printing blow, a receptacle for the card, a catch adapted, when actuated, to retract the printing hammer and strain the spring, and a cam, flexibly connected with and actuated by the driving mechanism of the machine, for throwing the catch out of operative position to prevent the operation of the printing hammer, and having a finger adapted to engage a card when properly inserted in the receptacle, to move the cam out of operative position, whereby no printing will be done unless a card is properly inserted in the receptacle, and driving mechanism for actuating said cam.

57. In card-actuated devices for a machine for printing elapsed times upon a card the combination of a card, a card receptacle therefor, a yielding finger adapted to take into a cut-out portion of the card, forming a time mark, and a sloping surface at one end of the card receptacle against which the finger is adapted to take to force the finger out of the receptacle to permit the insertion of a card therein.

58. In a machine for indicating elapsed times of a higher and a lower denomination the combination with means for indicating elapsed times and the regular stop of the higher denomination of a clock movement, of a subtractor stop for the higher denomination controlled by the clock movement and located one point in advance of the regular stop of said denomination adapted when actuated to stop the indicating mechanism of said higher denomination one point ahead of its stoppage by the regular stop, and means for actuating the subtractor stop controlled by the relative locations of the stop and a starting time mark of the lower denomination.

59. The combination of a clock movement, elapsed time indicating mechanism for indicating elapsed times of a higher and a lower denomination, means for starting it, a regular stop for the higher denomination, a subtractor stop for the higher denomination controlled by the clock movement and located one point in advance of the regular stop of said denomination adapted when actuated to stop the indicating mechanism of said higher denomination one point ahead of its stoppage by the regular stop, and means for actuating the subtractor stop controlled by the relative locations of the stop and a starting time mark of the lower denomination.

60. The combination of a clock movement, devices controlled by the clock movement for placing on a card starting time marks of a higher and a lower denomination, a card provided with such marks, separate elapsed time indicating mechanism for each denomination for indicating elapsed times, means for operating said indicating mechanism, devices, one for each elapsed time indicating mechanism, controlled by the starting time marks and adapted to control the starting of the indicating mechanism, stops, one for each indicating mechanism, controlled by the clock movement and adapted to stop the indicating mechanism, a subtractor stop for the higher denomination controlled by the clock movement and located one point in advance of the regular stop of said denomination adapted when actuated to stop the indicating mechanism of said higher denomination one point ahead of its stoppage by the regular stop, and means for actuating the subtractor stop controlled by the relative locations of the stop and starting time mark of the lower denomination, whereby, whenever the number of the unit of time of the lower denomination, when the card-actuated device of that denomination is operated, is less than the number of the unit of said denomination when the mark was placed upon the card, a unit of time of the higher denomination will be subtracted from the indication of that denomination.

61. In a machine for indicating elapsed times of a higher and a lower denomination the combination with the regular stop of the higher denomination of a clock movement, of a subtractor stop for the higher denomination, normally inoperative, controlled by the clock movement and located one point in advance of the regular stop of said denomination adapted, when made operative, to stop the indicating mechanism of said higher denomination one point ahead of its stoppage by the regular stop, and means for rendering the subtractor stop operatively controlled by the relative locations of the stop and a starting time mark of the lower denomination.

62. In a machine for indicating elapsed times of a higher and a lower denomination the combination with means for indicating elapsed times and regular stop at the higher denomination of a clock movement, of a subtractor stop for the higher denomination, normally inoperative, controlled by the movement and located one point in advance of the regular stop of said denomination adapted, when made operative, to stop the indicating mechanism of said higher denomination one point ahead of its stoppage by the regular stop, and means for rendering the subtractor stop operatively controlled by the relative locations of the stop and a starting time mark of the lower denomination, and means for rendering the subtractor stop inoperative at the end of the operation of the machine.

63. In a machine for indicating elapsed times the combination of a clock movement, elapsed time indicating mechanism, means for starting it in its elapsed time indicating operation controlled by the operator and driven independently of the clock movement, and stop mechanism, for stopping the indicating mechanism, controlled and driven by the clock movement.

64. The combination of a device for placing on a card a starting mark, an indicating mechanism, means for operating such mechanism, a starting device, controlled by the starting mark, adapted to control the operation of the indicating mechanism, and a stop for stopping such mechanism.

65. The combination of elapsed time indicating mechanism having variable limits to its elapsed time operation, a device for placing a time mark on a card, such mark adapted to control the indicating device as to one limit of its indicating operation, and a card provided with such a time mark.

66. The combination of indicating mechanism adapted to be set into operation by means of a starting mark on a card, a card provided with such a mark, and a stop for stopping such indicating mechanism.

67. In a time indicating machine the combination of a card provided with a starting time mark and a time controlled device adapted to be controlled in its starting operation by the starting time mark on the card.

68. The combination of indicating mechanism for giving indications of a higher and a lower denomination, a regular stop for the higher denomination, a subtractor stop for the higher denomination, located one point in advance of the regular stop of said denomination, adapted, when actuated, to stop the indicating mechanism of said higher denomination one point in advance of its stoppage by the regular stop, and means for actuating the subtractor stop controlled by the relative locations of the stop and a starting mark of the lower denomination.

69. The combination of a clock movement, a device controlled thereby for placing on a card a starting time mark, a card provided with such a mark, time indicating mechanism, means for operating such mechanism, a device, controlled by the starting time mark, adapted to control the starting of the time indicating mechanism, and a stop, controlled by the clock movement, for stopping such indicating mechanism.

70. The combination of a clock movement, devices controlled thereby for placing on a card starting time marks, a card provided with such marks, time indicating wheels, means for operating such wheels, devices, controlled by the starting time marks, adapted to control the starting of the said time indicating wheels, and stops, controlled by the clock movement, for stopping said wheels.

71. The combination of a clock movement, a device controlled thereby, for placing on a card a starting time mark, time indicating mechanism, a handle for operating said mechanism, a device also operated by the handle but controlled by the starting time marks and adapted to control the starting of the time indicating mechanism, and a stop, controlled by the clock movement, for stopping such indicating mechanism.

72. In a time recorder the combination of a marking device adapted to make a preliminary mark upon a record surface and mechanism, adapted to be controlled by said preliminary mark, for making a final mark upon the record surface.

73. In a time recorder the combination of an operating part, an automatically controlled device set in operation by said part for making a preliminary mark upon a record surface, a record surface provided with such preliminary mark, and recording mechanism adapted to be controlled by said preliminary mark for making a final mark upon said record surface.

74. The combination of a clock movement, a device for placing on a card a starting time mark, a card provided with such a mark, elapsed time indicating mechanism, means for operating such mechanism to cause it to indicate elapsed time, and a device, controlled by the starting time mark and adapted to affect the extent of operation of the elapsed time indicating mechanism.

75. The combination of a clock movement, elapsed time indicating mechanism, means for operating such mechanism in its elapsed time indicating movement to cause it to indicate elapsed time, and means controlled by the said clock movement for limiting the extent of the elasped time indicating movement of the said mechanism.

76. The combination of a device for placing on a card a starting mark, a card provided with such a mark, an indicating mechanism, means for operating such mechanism and a device, controlled by the starting mark and adapted to affect the extent of operation of the indicating mechanism.

77. The combination of elapsed time indicating mechanism adapted to be affected in its elapsed time indicating operation by a starting time mark on a card, a card provided with such a mark and means for operating the elapsed time indicating mechanism.

78. In an elapsed time indicating machine, the combination of elapsed time indicating mechanism, and a device for placing on a card a starting time mark adapted to affect the extent of operation of the elapsed time indicating mechanism.

79. The combination of mechanism adapted to indicate the elapsed time between two events, a device representing the time of the prior event, and means, controlled by said device, for controlling the elapsed time indicating mechanism as to one limit of its elapsed time indicating operation.

80. In an elapsed time indicating machine the combination of a card provided with a mark representing the time of a prior operation, a clock movement, and mechanism jointly controlled by the clock movement and the mark on the card for making an indication of the elapsed time between said prior time and the time of a later operation of the machine.

81. The combination of a card provided with a starting time mark, and an elapsed time indicating mechanism adapted to be affected in its elapsed time indicating movement by the time mark on the card.

82. Elapsed time indicating mechanism, clock-controlled means for controlling it as to one limit of its elapsed time operation and means for controlling it as to the other limit of such operation controlled by a mark on a card representing the time of a prior operation, and a card provided with such a mark.

83. The combination of elapsed time indicating mechanism, a card, and a device for placing on the card a time mark adapted to affect the extent of movement of the elapsed time indicating mechanism.

84. The combination of elapsed time indicating mechanism, a card, and a device adapted to be controlled by a time mark on the card to affect the extent of movement of the elapsed time indicating mechanism.

85. The combination of a clock movement, devices for placing on a card time marks, a card provided with such marks, elapsed time indicating mechanism, means for operating such mechanism to cause it to indicate elapsed time, and devices, controlled by the time marks and adapted to limit the extent of operation of the elapsed time indicating mechanism.

86. The combination of elapsed time indicating mechanism, a clock movement, a card, and a device, controlled by the clock movement, for placing on the card a time mark adapted to affect the extent of operation of the elapsed time indicating mechanism.

87. The combination of elapsed time indicating mechanism, a clock movement, a card, and a punch, controlled by the clock movement, for punching time holes in the card adapted to affect the extent of movement of the elapsed time indicating mechanism.

88. The combination of elapsed time recording mechanism, a time mark on a card, and means, controlled by the said mark on the card, for controlling the elapsed time recording mechanism as to one limit of its elapsed time recording operation.

89. The combination of elapsed time recording mechanism, a time mark on a card, and means, controlled by the said mark, for starting the elapsed time recording mechanism in its elapsed time recording operation.

90. In a machine for indicating elapsed time, the combination of elapsed time indicating mechanism, and a device adapted to be controlled by a time mark on a card, and adapted to affect the extent of operation of the elapsed time indicating mechanism, a card provided with such a mark.

91. In a machine for indicating elapsed time, the combination of elapsed time indicating mechanism, devices adapted to be controlled by time marks on a card and connections between the devices and the elapsed time indicating mechanism, whereby the elapsed time indicating mechanism will be affected by the location of the marks on the card.

92. The combination of elapsed time indicating means, clock-controlled at the finish of its indication, and a card provided with a starting time mark representing the time of a prior operation and adapted to control or affect the elapsed time indication of the indicating means, whereby an indication will be given of the elapsed time between two operations.

93. The combination of a clock movement, elapsed time indicating means controlled as to one limit of its indication by the clock movement, a card with a starting time mark thereon, and means for causing the said mark to control the indicating means as to the other limit of its indication.

94. In a machine for indicating elapsed time, the combination of a clock movement, indicating mechanism, means for operating it in its elapsed time indicating movement controlled by the operator, and connections between the operating means and the indicating mechanism controlled by the clock movement and by a mark on a card representing the time of a prior operation of the machine, and a card provided with such a mark.

95. In an elapsed time indicating machine the combination of elapsed time indicating mechanism adapted to be set into operation by means of a starting time mark on a card, a card provided with such a mark, and a time-controlled stop for stopping such indicating mechanism.

96. In an elapsed time indicating machine the combination of elapsed time indicating mechanism, having variable limits to its elapsed time operation, both in the starting and in the stopping of such operation, and clock-controlled means for variably controlling the stoppage of the indicating mechanism in its elapsed time operation.

97. The combination of elapsed time indicating mechanism adapted to indicate the elapsed time between two different operations of the machine, and a starting device representing the time of the earlier operation adapted to control the time of the elapsed time indicating operation of said mechanism.

98. The combination of a plurality of imprint-taking devices, means for actuating said devices, and a card, said actuating means operating all of said devices when said card is in one position and a part only of said devices when the card is not in such position.

99. In an elapsed time recording machine, the combination of elapsed time recording mechanism, means representing a prior time for starting the recording mechanism, and means representing a later time for stopping it, whereby a record of the time elapsing between the two operations may be recorded.

100. In an elapsed time indicating machine elapsed time indicating mechanism adapted to be started in its elapsed time indicating operation by a time device representing a prior time and to be stopped by a clock movement and a clock movement.

101. In an elapsed time recording machine elapsed time recording mechanism, means adapted to be controlled by a time mark on a card representing the time of a prior operation for starting the recording mechanism in its elapsed time operation, and means adapted to stop it in accordance with the time of a subsequent operation.

102. The combination of a clock movement, elapsed time indicating mechanism, means for moving it one way in its elapsed time indicating operation controlled by the operator and means controlled by the clock movement for regulating the extent of such movement.

103. The combination of a clock movement, elapsed time indicating mechanism, means for starting it in its elapsed time indicating movement controlled by the operator, and means for stopping it in such movement controlled by the clock movement.

104. The combination of elapsed time indicating mechanism, means for starting it in its elapsed time indicating movement in accordance with a predetermined time, and means for limiting it in said movement.

105. The combination of elapsed time indicating mechanism, means representing the time of the first or starting operation of the machine, for starting it in its elapsed time indicating movement, and means, representing the time of the second or finishing operation of the machine, for stopping it in said movement, whereby the elapsed time between two operations of the machine will be indicated by the elapsed time indicating mechanism.

106. In an elapsed time indicating machine, the combination with a card, a clock movement, a punch adapted to move over the card and to punch holes therein, driving means for moving the punch over the card containing a detachable connection, and means operated by the clock movement for operating the detachable connection to disconnect the punch from its driving means, and means for causing the punch to punch holes in the card, whereby the location of a hole punched in the card will depend on the clock movement and will represent the time of the operation of the machine.

107. In an elapsed time indicating machine, the combination of a clock movement, a card, an hour punch, a minute punch, means for moving each punch along the card, a detachable connection between each punch and its driving means, means controlled by the clock movement for operating each detachable connection, one controlled by the hour part of the clock movement for causing the detachable connection to disconnect the hour punch from its driving means, and the other controlled by the minute part of the clock movement for causing the other detachable connection to disconnect the minute punch from its driving means, whereby the punches will move over the card and stop at places representing the hour and minute of the operation of the machine, and means for operating the punches to cause them to punch holes in the card, whereby the location of the holes punched in the card will represent the hour and minute of the operation of the machine.

108. In an elapsed time indicating machine, the combination of a clock movement, having a minute part and an hour part, a card, an hour punch, a minute punch, means for moving the minute punch along the card, means for stopping the punch in said movement, controlled by the minute part of the clock movement, in accordance with the minute of the operation of the machine, means for thereafter moving the hour punch along the card, means controlled by the hour part of the clock movement, for stopping the hour punch in accordance with the hour of the operation of the machine, and means for operating the punches to cause them to punch holes in the card, whereby the minute punch will complete its movement before the hour punch starts its movement, and whereby the holes punched in the card will represent the minute and hour the holes were punched by the machine.

109. In an elapsed time indicating mechanism, the combination of a card, elapsed time indicating mechanism, and a device for placing on the card a starting time mark adapted to affect the extent of operation of the elapsed time indicating mechanism.

110. In an elapsed time indicating machine, the combination of elapsed time indicating mechanism, a card, and a device adapted to be actuated by a starting time mark on the card to affect the extent of movement of the elapsed time indicating mechanism.

111. In an elapsed time indicating mechanism, the combination of a clock movement, a card, a punch for punching holes in the card, means for causing the punch and card to move one relatively to the other, and means controlled by the clock movement for stopping such movement, and means for causing the punch to punch holes in the card, whereby the holes punched in the card will represent the times of operation of the machine.

112. The combination of a clock movement, a device controlled by the clock movement and adapted to make an initial mark on a card representing the time of the operation of such device, a card provided with such a mark, calculating mechanism, and a device for controlling the calculating mechanism in its operation adapted to be itself controlled for that purpose by the said time mark on the card.

113. In an elapsed time indicating machine a minute punch and an hour punch, means for moving the minute punch its full operation and then for moving the hour punch and cams clock-controlled for limiting the extent of movement of each punch.

114. The combination of a clock movement, a card, a device, controlled by the clock movement, for placing on the card a starting time mark, and an elapsed time indicating mechanism controlled in its elapsed time indicating operation by both the clock movement and the starting time mark previously placed on the card.

115. The combination of a clock movement, a card, a device, controlled by the clock movement, for placing on the card a starting time mark, and an elapsed time indicating mechanism controlled in its elapsed time indicating operation by the clock movement as to one limit of its said operation and by the starting time mark on the card as to the other limit.

116. An elapsed time indicating device adapted to be controlled in its elapsed time indicating operation by a time mark on a card representing the time of a prior operation and by a clock movement, a card provided with such a mark, and a clock movement.

117. The combination of a clock movement, an elapsed time indicating device controlled in part by the clock movement, a card with a time mark representing a prior time, and connections, controlled by the mark on the card, for also affecting the elapsed time indicating operation of the device in accordance with such mark, whereby the indicating device will give an indication representing the time elapsing between two operations.

118. The combination of elapsed time indicating mechanism and a carriage for controlling the same composed of two parts yieldingly connected together, each supported and moving upon a suitable guide rod.

119. In an elapsed time indicating machine the combination of a device for placing a time mark on a card, a reciprocating carriage for moving the marking device, a clock stop, and a detachable connection between the carriage and the marking device adapted to be controlled by the clock stop.

120. In an elapsed time indicating machine the combination of elapsed time indicating mechanism, a punch, a rod upon which the punch is free to reciprocate and a locking and guiding bar for the punch.

121. The combination of a card provided with a time mark representing a prior time, and elapsed time indicating mechanism adapted to be affected in its elapsed time indication by the said time mark on the card.

122. An elapsed time indicator for indicating the elapsed time between two operations of said indicator comprising means for punching a card on the first operation and means coöperating with said punch mark to control on the second operation the mechanism of the indicator to indicate on
5 the card said elapsed time without calculation.

In testimony whereof, we have signed our names to this specification, in the presence of two subscribing witnesses.

HARRY T. GOSS.
JAMES W. BRYCE.

Witnesses:
JOHN O. GEMPLER,
EDWIN SEGER.

Copies of this patent may be obtained for five cents each, by addressing the "Commissioner of Patents, Washington, D. C."